(12) United States Patent
Koh et al.

(10) Patent No.: US 12,538,392 B2
(45) Date of Patent: Jan. 27, 2026

(54) COOKING APPARATUS

(71) Applicant: SAMSUNG ELECTRONICS CO., LTD., Suwon-si (KR)

(72) Inventors: Kyumin Koh, Suwon-si (KR); Gyeongjin Kim, Suwon-si (KR); Minjae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 608 days.

(21) Appl. No.: 18/148,336

(22) Filed: Dec. 29, 2022

(65) Prior Publication Data

US 2023/0139117 A1    May 4, 2023

Related U.S. Application Data

(63) Continuation of application No. PCT/KR2021/007809, filed on Jun. 22, 2021.

(30) Foreign Application Priority Data

Jun. 29, 2020 (KR) .................... 10-2020-0079458

(51) Int. Cl.
*H05B 6/64* (2006.01)
*A47J 37/06* (2006.01)

(52) U.S. Cl.
CPC ........ *H05B 6/6402* (2013.01); *A47J 37/0629* (2013.01)

(58) Field of Classification Search
None
See application file for complete search history.

(56) References Cited

FOREIGN PATENT DOCUMENTS

| | | |
|---|---|---|
| EP | 2456284 B1 | 6/2016 |
| JP | H06174237 A | 6/1994 |
| JP | 6588591 B2 | 10/2019 |
| KR | 20-1997-0044272 U | 12/1997 |
| KR | 0131952 B1 | 4/1998 |
| KR | 1999-0064002 A | 7/1999 |
| KR | 10-0233442 B1 | 1/2000 |
| KR | 10-0265630 B1 | 10/2000 |
| KR | 10-2002-0082041 A | 10/2002 |
| KR | 20-0380809 Y1 | 4/2005 |
| KR | 10-0641445 B1 | 10/2006 |
| KR | 10-2007-0066429 A | 6/2007 |
| KR | 10-0730964 B1 | 6/2007 |

(Continued)

OTHER PUBLICATIONS

International Search Report and Written Opinion of the International Searching Authority dated Oct. 8, 2021, in connection with International Application No. PCT/KR2021/007809, 8 pages.

*Primary Examiner* — Robert G Bachner

(57) ABSTRACT

A cooking apparatus comprises a cooking chamber in which a food is cooked and opened in a first direction, a heater arranged at a side of the cooking chamber and configured to provide heat into the cooking chamber, a magnetron configured to generate a high frequency supplied into the cooking chamber, and a folding shelf detachably mounted in the cooking chamber and configured to be foldable. The folding shelf extends in a second direction to support the food at a first mounting position, and while the folding shelf is in a folded state, the folding shelf configured to divide the cooking chamber into a plurality of cooking spaces at a second mounting position.

20 Claims, 14 Drawing Sheets

(56) References Cited

FOREIGN PATENT DOCUMENTS

| KR | 10-2009-0030403 A | 3/2009 |
|----|-------------------|--------|
| KR | 10-2012-0127870 A | 11/2012 |
| KR | 10-2014-0084942 A | 7/2014 |
| KR | 10-1774395 B1 | 9/2017 |
| KR | 10-2017-0135619 A | 12/2017 |
| KR | 10-1851219 B1 | 6/2018 |

COOKING APPARATUS

CROSS-REFERENCE TO RELATED APPLICATIONS

This application is a continuation of International Application PCT/KR2021/007809, filed Jun. 22, 2021, and claims foreign priority to Korean application 10-2020-0079458, filed Jun. 29, 2020, the disclosures of which are incorporated herein by reference in their entireties.

BACKGROUND

1. Field

The present disclosure relates to a cooking apparatus, and more particularly, to a cooking apparatus capable of dividing a cooking space in a cooking chamber.

2. Description of Related Art

A cooking apparatus is an appliance for heating and cooking an object to be cooked, such as a food, and refers to a device capable of providing various functions related to cooking, such as heating, thawing, drying, and sterilization of the object to be cooked. Examples of such a cooking apparatus include an oven such as a gas oven or an electric oven, a microwave heating device (hereinafter referred to as a microwave), a gas range, an electric range, a gas grill, or an electric grill.

In general, an oven is a device that cooks a food by transferring heat directly to the food through a heat source such as a heater or by heating an inside of a cooking chamber. A microwave oven is a device that cooks a food by using frictional heat between molecules that is generated by disrupting a molecular arrangement of the food with a high frequency as a heat source.

For cooking two or more different types of foods by using a cooking apparatus, an optimum temperature or method at which each food is cooked may be different. Accordingly, there is a need for a cooking apparatus configured to cook each food, in a suitable manner, in a plurality of cooking spaces.

The present disclosure is directed to providing a cooking apparatus including a plurality of cooking spaces into which a plurality of different foods is respectively inserted.

Further, the present disclosure is directed to providing a cooking apparatus capable of, when a plurality of different types of food is simultaneously cooked, cooking the different types of food with an optimal method for each food.

Further, the present disclosure is directed to providing a cooking apparatus capable of easily cooking a plurality of different types of food in a cooking chamber by effectively dividing a cooking space.

SUMMARY

One aspect of the present disclosure provides a cooking apparatus including a cooking chamber in which a food is cooked and opened in a first direction, a heater arranged at a side of the cooking chamber and configured to provide heat into the cooking chamber, a magnetron configured to generate a high frequency supplied into the cooking chamber, and a folding shelf detachably mounted in the cooking chamber and configured to be foldable. The folding shelf extends in a second direction to support the food at a first mounting position, and while the folding shelf is in a folded state, the folding shelf is configured to divide the cooking chamber into a plurality of cooking spaces at a second mounting position.

The plurality of cooking spaces may include a first space arranged on a first side along the second direction, and a second space arranged on a second side along the second direction.

The cooking apparatus may further include a shelf fixer protruding from a lower portion of the cooking chamber to an inside of the cooking chamber so as to fix the folding shelf.

The shelf fixer may comprise a plurality of shelf fixers. The plurality of shelf fixers may be spaced apart along the second direction, and the folding shelf may be arranged between the plurality of shelf fixers.

The heater may comprise a plurality of heaters. The plurality of heaters may be arranged in an upper portion of the cooking chamber to be spaced apart along the second direction, and at least one of the plurality of heaters may be configured to provide heat to the first space.

The cooking apparatus may further include a first side wall and a second side wall facing each other in the second direction of the cooking chamber, and at least one sensor provided in the cooking chamber and configured to detect a mounting position of the folding shelf. The at least one sensor may include a first sensor provided on at least one of the first side wall or the second side wall and configured to detect whether the folding shelf is mounted at the first mounting position.

The folding shelf may extend in a third direction, at the second mounting position, and the cooking apparatus may further include a second sensor provided on a rear wall of the cooking chamber and is configured to detect whether the folding shelf is mounted at the second mounting position.

The cooking apparatus may further include a first auxiliary shelf inserted into the first space to divide the first space into a plurality of first auxiliary spaces, and a second auxiliary shelf inserted into the second space to divide the second space into a plurality of second auxiliary spaces.

The cooking apparatus may further include a user interface configured to display an insertion position of the folding shelf based on information that is detected by the at least one sensor, and receive an input from a user, and a controller configured to control the user interface to display a recommended cooking space among the plurality of cooking spaces in response to obtaining the information detected by the at least one sensor.

The controller may be configured to control the heater and the magnetron to transfer heat and a high frequency to the recommended cooking space among the plurality of cooking spaces.

The cooking chamber may include a first side wall and a second side wall provided to face each other, and including a support member, respectively. The folding shelf may include a first shelf member forming the first space between the first side wall and the first shelf member, and a second shelf member forming the second space between the second side wall and the second shelf member. Each of the first shelf member and the second shelf member may include a support protrusion formed on a lower surface thereof to support a plurality of auxiliary shelves.

While the folding shelf is in a folded state, the plurality of auxiliary shelves may include a first auxiliary shelf inserted between the first side wall and the first shelf member and supported by the support member of the first side wall and the support protrusion of the first shelf member, and a second auxiliary shelf inserted between the second side wall and the second shelf member and supported by the support member of the second side wall and the support protrusion of the second shelf member.

The folding shelf may further include a hinge device arranged between the first shelf member and the second shelf member. The hinge device may include a connecting member extending in the second direction between the first shelf member and the second shelf member, a first hinge configured to rotate the first shelf member and the connecting member, and a second hinge configured to rotate the second shelf member and the connecting member.

The folding shelf may include a stopper provided on at least one of an upper portion or a lower portion of the first shelf member and the second shelf member to allow the folding shelf to be supported in a vertical direction.

The stopper may include a plurality of lower stoppers provided in a lower portion of each of the first shelf member and the second shelf member. The cooking apparatus may further include a plurality of shelf fixers protruding from the lower portion of the cooking chamber toward an inside of the cooking chamber so as to be in contact with the plurality of lower stoppers at the second mounting position, so as to fix the folding shelf.

Another aspect of the present disclosure provides a cooking apparatus including a cooking chamber opened in a first direction, a plurality of heaters arranged in a second direction so as to provide heat into the cooking chamber, the plurality of heaters configured to be controlled independently of each other, a magnetron provided to generate a high frequency supplied into the cooking chamber, and a folding shelf detachably mounted in the cooking chamber so as to support a food, and provided to be foldable. The folding shelf can be configured to divide the cooking chamber into a plurality of cooking spaces arranged in the second direction when mounted to the cooking chamber in a folded state.

The folding shelf can be mounted in a vertical direction while in the folded state and is configured to divide the plurality of cooking spaces in a left and right direction.

The cooking apparatus may further include a plurality of auxiliary shelves inserted into each of the plurality of cooking spaces to divide the each of the plurality of cooking spaces into a plurality of auxiliary spaces arranged in a third direction.

Another aspect of the present disclosure provides a cooking apparatus including a cooking chamber including a first side wall and a second side wall facing each other, a heater configured to provide heat into the cooking chamber, a magnetron configured to generate a high frequency supplied into the cooking chamber, and a folding shelf detachably mounted in the cooking chamber and configured to be foldable. The folding shelf extends between the first side wall and the second side wall so as to support a food, at a first mounting position, and when the folding shelf is in a folded state, the folding shelf can be configured to divide the cooking chamber into a plurality of cooking spaces at a second mounting position.

The folding shelf may extend in a vertical direction at the second mounting position, so as to arrange the plurality of cooking spaces in a left and right direction.

A cooking apparatus may include a plurality of cooking spaces by using a folding shelf.

Further, a cooking apparatus may cook a food placed in a plurality of cooking spaces in different optimal ways.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
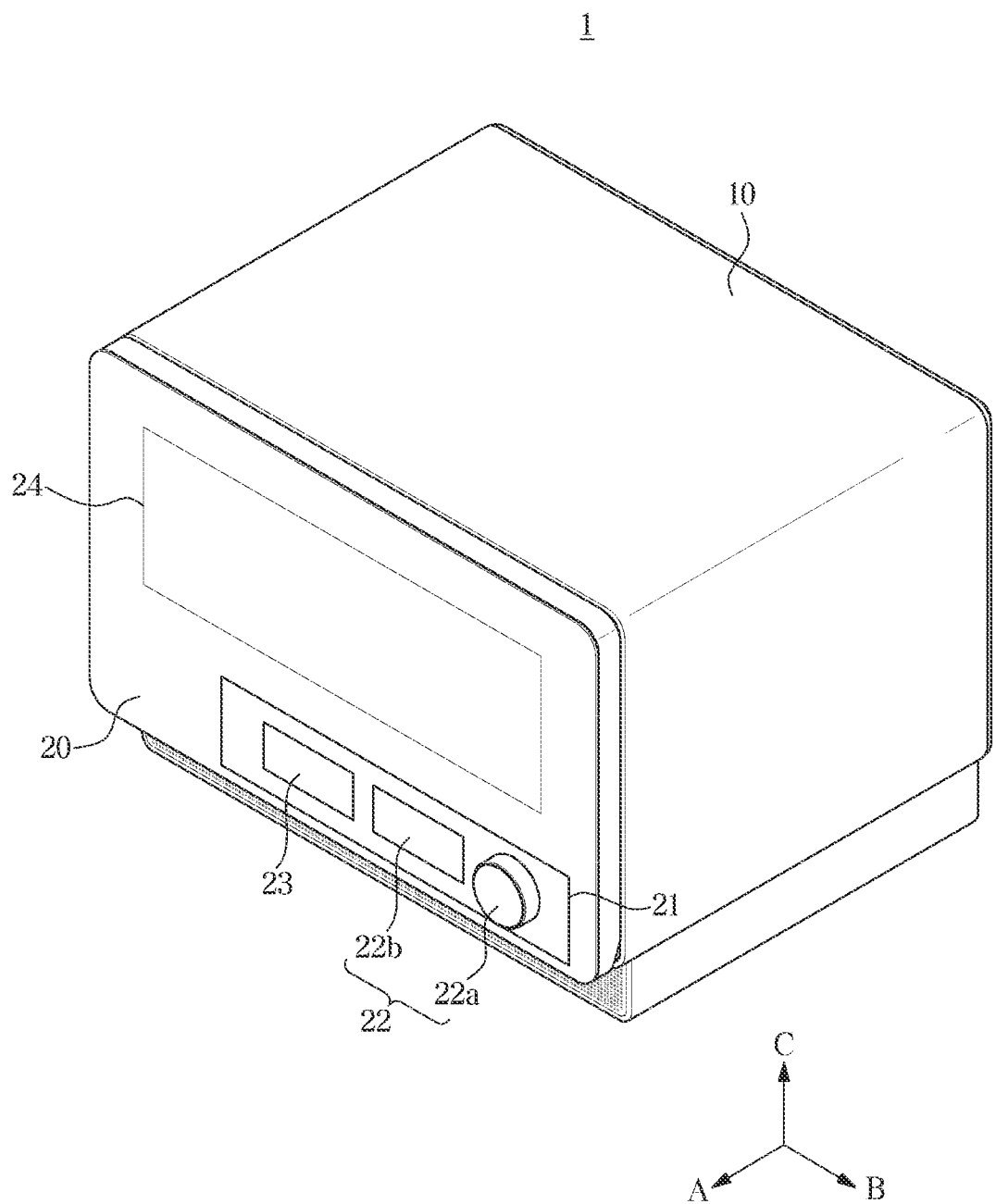
FIG. 1 is a perspective view illustrating a cooking apparatus according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front," "rear," "left side," "right side," and the like may be defined by the drawings, but the shape and the location of the component is not limited by the term.

Particularly, as shown in FIG. 1, a direction, to which a door 20 is directed, is defined as a front side, and a rear side, left and right sides, and upper and lower sides are defined based on the definition of the front side.

Hereinafter exemplary embodiments of the present disclosure will be described particularly with reference to the accompanying drawings.

Figure 2:
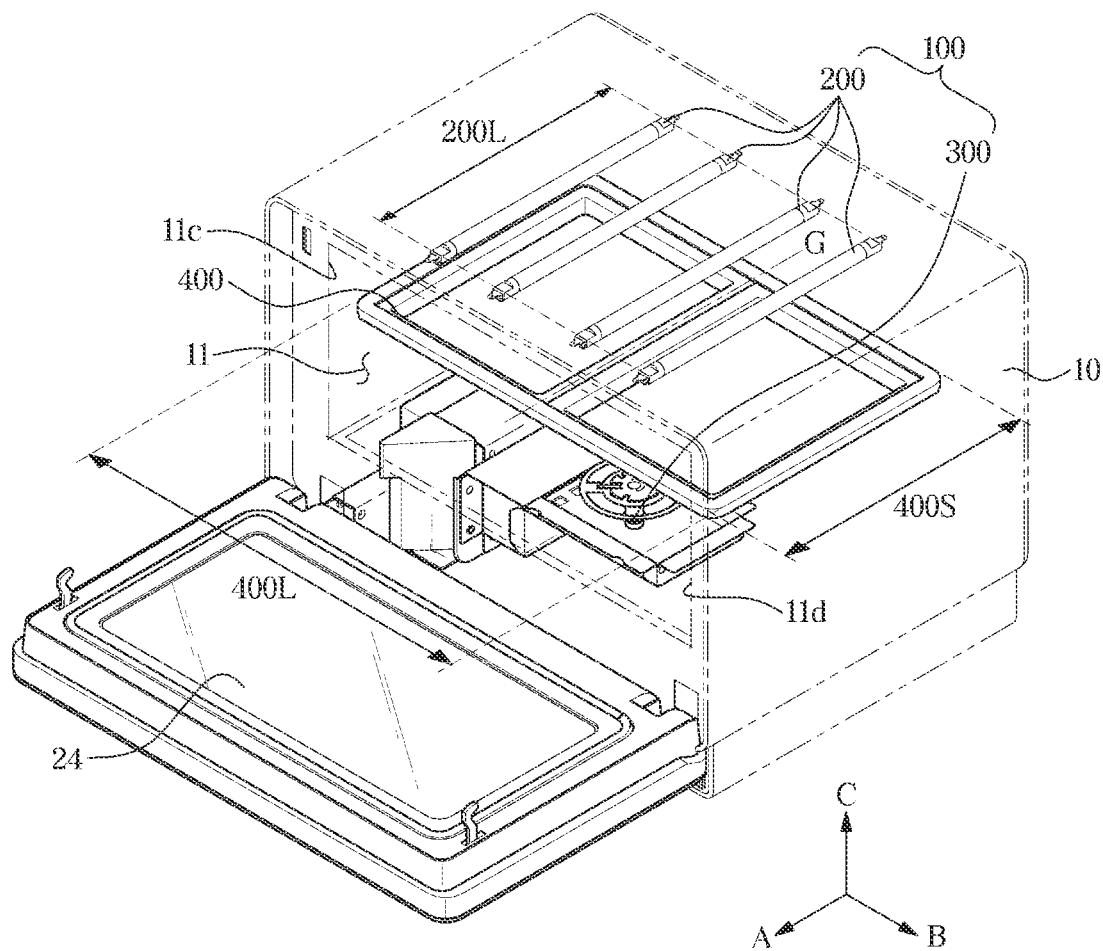
FIG. 2 is a view illustrating a partial configuration of an interior of the cooking apparatus shown in FIG. 1.
Figure 3:
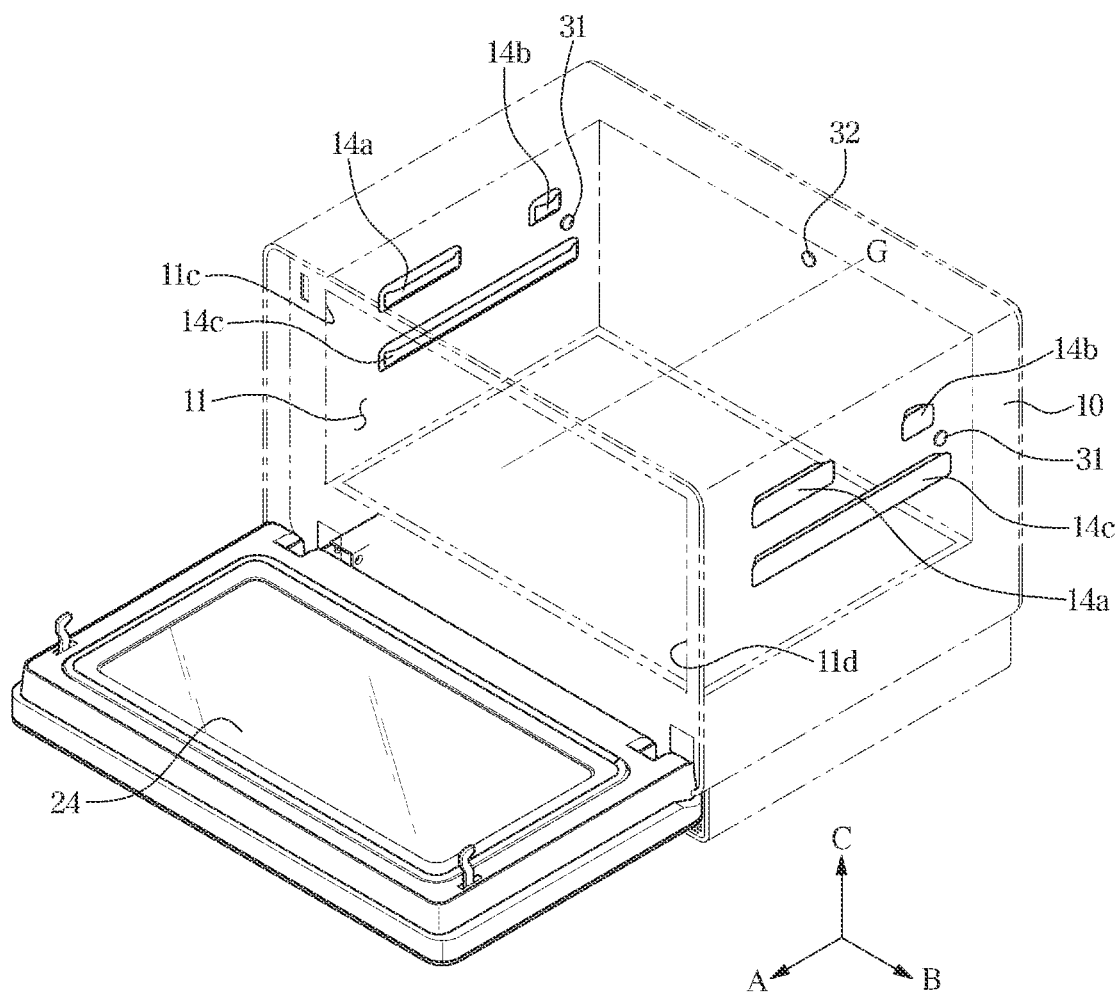
FIG. 3 is a view illustrating a state in which a folding shelf and a heat source are removed from the cooking apparatus shown in FIG. 2.

FIG. 1 is a perspective view illustrating a cooking apparatus according to various embodiments of the present disclosure. FIG. 2 is a view illustrating a partial configuration of an interior of the cooking apparatus shown in FIG. 1. FIG. 3 is a view illustrating a state in which a folding shelf 400 and a heat source 100 are removed from the cooking apparatus shown in FIG. 2.

Referring to FIGS. 1 to 3, a cooking apparatus 1 may include a housing 10 provided to form an exterior, and a cooking chamber 11 arranged inside the housing 10 and in which a food is placed.

The cooking apparatus 1 may include an inner housing 12 arranged inside the housing 10 and provided to form the cooking chamber 11. A certain separation space 15 may be formed between the inner housing 12 and the housing 10.

The housing 10 and the inner housing 12 may be provided to be opened in a first direction A, which is a front direction of the cooking apparatus 1.

A user may place the food to the cooking chamber 11 through an opening of the inner housing 12 formed in the first direction A.

The cooking chamber 11 may be provided in a substantially rectangular parallelepiped shape having a long side in a second direction B perpendicular to a left and right direction with respect to the first direction A.

The cooking apparatus 1 may include a machine room 13 formed inside the housing 10 and arranged below the cooking chamber 11. Various electronic components configured to drive the cooking apparatus 1 may be arranged inside the machine room 13.

The cooking chamber 11 may be opened in the first direction A. The cooking chamber 11 may include a first side wall 11c and a second side wall 11d in the second direction B. Further, the cooking chamber 11 may include an upper surface 11a and a lower surface 11b in a third direction C.

The cooking apparatus 1 may include a door 20 configured to open and close an opening of the housing 10 and the inner housing 12.

The door 20 may include a user interface 21 configured to receive an input from a user and provided to display operation information. However, the user interface 21 may be arranged in the housing 10 according to embodiments.

The user interface 21 may include an input 22 configured to receive an input from a user, and a display 23 provided to display operation information. According to embodiments, the user interface 21 may further include a speaker configured to output a sound about operation information.

The input 22 may include a first input 22a provided in the form of a jog dial to receive a selection of a cooking temperature, a selection of a cooking time, and a selection of a cooking space, and a second input 22b provided in the form of a button or an icon so as to receive an input related to a start of a cooking operation and a stop of a cooking operation and a selection of a control target. However, the input 22 is not limited thereto, and according to embodiments, the input may be provided in various types capable of receiving an input for controlling the cooking apparatus 1 from a user.

The display 23 may display information that is input by a user, such as information on a cooking temperature, a cooking time, and a cooking space selected by a user. In addition, the display 23 may display a notification about an arrangement of target food, information on a recommended food that may be cooked simultaneously with the target food, or information on a recommended menu that may be made from the target food. For this, the display 23 may be provided with a known type of display panel.

The display 23 may be provided as a touch screen according to embodiments, and in this case, the input 22 may be provided integrally with the display 23. The door 20 may include a transparent member 24 formed of a transparent material to allow a user to observe an inside of the cooking chamber 11 when the door 20 is closed.

The cooking apparatus 1 may include a folding shelf 400 mounted inside the cooking chamber 11 and provided to allow a user to place a food therein. The folding shelf 400 may be detachably arranged inside the cooking chamber 11.

The cooking chamber 11 may include a support member 14 formed on opposite sides of the cooking chamber 11 to allow the folding shelf 400 to be mounted between the upper surface 11a and the lower surface 11b of the cooking chamber 11.

In the drawings, the support member 14 is mounted at a predetermined height, but is not limited thereto. Alternatively, the support member may be provided in plurality in the third direction C vertically perpendicular to the first direction A or the second direction B, so as to allow the folding shelf 400 to be mounted at various heights.

The support member 14 may include a first support member 14a, a second support member 14b, and a third support member 14c. The first support member 14a may be provided adjacent to the front. The second support member 14b may be provided behind the first support member 14a. That is, the second support member 14b may be provided adjacent to a rear wall of the cooking chamber 11. The third support member 14c may be provided under the first support member 14a. The folding shelf 400 may be inserted between the first support member 14a and the third support member 14c. The first support member 14a and the third support member 14c may fix the folding shelf 400 to prevent the folding shelf 400 from separating. The first support member 14a and the second support member 14b may support the folding shelf 400 from an upper side of the folding shelf 400. Accordingly, the first support member 14a may correspond to a first fixer, and the second support member 14b may correspond to a second fixer.

The first support member 14a may be formed to be longer than the second support member 14b with respect to the first direction A. However, the present disclosure is not limited thereto, and the first support member 14a may be shorter than the second support member 14b with respect to the second direction B. The third support member 14c may support the folding shelf 400 under the folding shelf 400. Accordingly, the third support member 14c may be formed to correspond to a length of a short side of the folding shelf 400. However, the present disclosure is not limited thereto and the third support member 14c may be extended by various lengths to support the folding shelf 400.

In drawings, the first support member 14a and the second support member 14b are spaced apart from each other, but the first support member 14a and the second support member 14b may be connected to each other. That is, the first support member 14a and the second support member 14b may be integrally formed with each other.

In the drawings, three support members 14 are provided on each side wall but are not limited thereto. The support member 14 may be formed in various numbers to allow a plurality of folding shelves 400 or a plurality of auxiliary shelves 500 to be inserted thereto. Further, the support member 14 may be formed in a number corresponding to support protrusions 414 and 424 to allow the auxiliary shelf 500 to be inserted between the support member 14 and the support protrusions 414 and 424.

The cooking apparatus may include at least one sensor 30 configured to detect whether the folding shelf 400 is inserted into the cooking chamber 11. The at least one sensor 30 may detect whether the folding shelf 400 is inserted into the cooking chamber 11 and detect an insertion position, and the information may be displayed on the user display 23.

The at least one sensor 30 may be a micro switch, an IR sensor, and an internal camera. However, the present disclosure is not limited thereto, and various sensors may be included as long as a sensor is configured to feedback an internal situation of the cooking chamber 11.

The at least one sensor 30 may include a first sensor 31 and a second sensor 32.

The first sensor 31 may be formed on left and right walls of the cooking chamber 11. That is, the first sensor 31 may be provided in plurality. The first sensor 31 may be arranged on the left and right walls of the cooking chamber 11 to detect whether the folding shelf 400 is inserted into a first mounting position. That is, in response to inserting the folding shelf 400 into the first mounting position, the first sensors 31 arranged on both side walls may detect the folding shelf 400.

In addition, even when the auxiliary shelf 500 as well as the folding shelf 400 is inserted, the first sensor 31 may detect information on whether the auxiliary shelf is inserted and a position thereof. The auxiliary shelf 500 may be inserted into a first space 111 adjacent to the first side wall 11c or into a second space 112 adjacent to the second side wall 11d and thus it is not required to operate all of the plurality of first sensors 31. Accordingly, at least one of the plurality of first sensors 31 may detect information regarding whether the auxiliary shelf 500 is inserted and the position thereof.

The first sensor 31 may be arranged between the second support member 14b and the third support member 14c. That is, the first sensor 31 may be arrange at a position adjacent to the rear wall of the cooking chamber 11 so as to detect whether the folding shelf 400 is correctly mounted at the first mounting position. However, the arrangement of the first sensor is not limited thereto and the first sensor may be arranged adjacent to the door along the first direction A.

The second sensor 32 may be provided on the rear wall of the cooking chamber 11. Accordingly, the second sensor 32 may detect whether the folding shelf 400 is inserted into a second mounting position. That is, in response to inserting the folding shelf 400 into the second mounting position, the second sensor 32 provided on the rear wall may detect the folding shelf 400. The second sensor 32 may be arranged to correspond to a line through which a center line of the cooking chamber 11 passes.

In drawings, a single second sensor 32 is arranged on the rear wall, but is not limited thereto. Alternatively, the second sensor 32 may be provided in plurality. Further, the second sensor 32 may be arranged in various positions such as a front portion, a rear portion, or a central portion of the upper wall, not the rear wall, so as to detect whether the folding shelf 400 is mounted at the second mounting position. In drawings, the second sensor 32 is arranged on an upper portion of the rear wall but is not limited thereto. The second sensor 32 may be arranged on a central portion and a lower portion of the rear wall as long as the second sensor 32 is configured to detect whether the folding shelf 400 is mounted at the second mounting position.

The at least one sensor 30 may detect the mounting positions of the folding shelf 400 and the auxiliary shelf 500 and display the information thereof on the user interface 21. In addition, the cooking apparatus may include a controller 40 to be described later. The controller 40 may obtain information detected from the at least one sensor 30 to allow the user interface 21 to display a recommended cooking space among a plurality of cooking spaces. In addition, the controller 40 may provide a recommended menu and a recommended recipe corresponding to the food. However, the present disclosure is not limited thereto, and various information may be displayed on the user interface 21.

Figure 4:
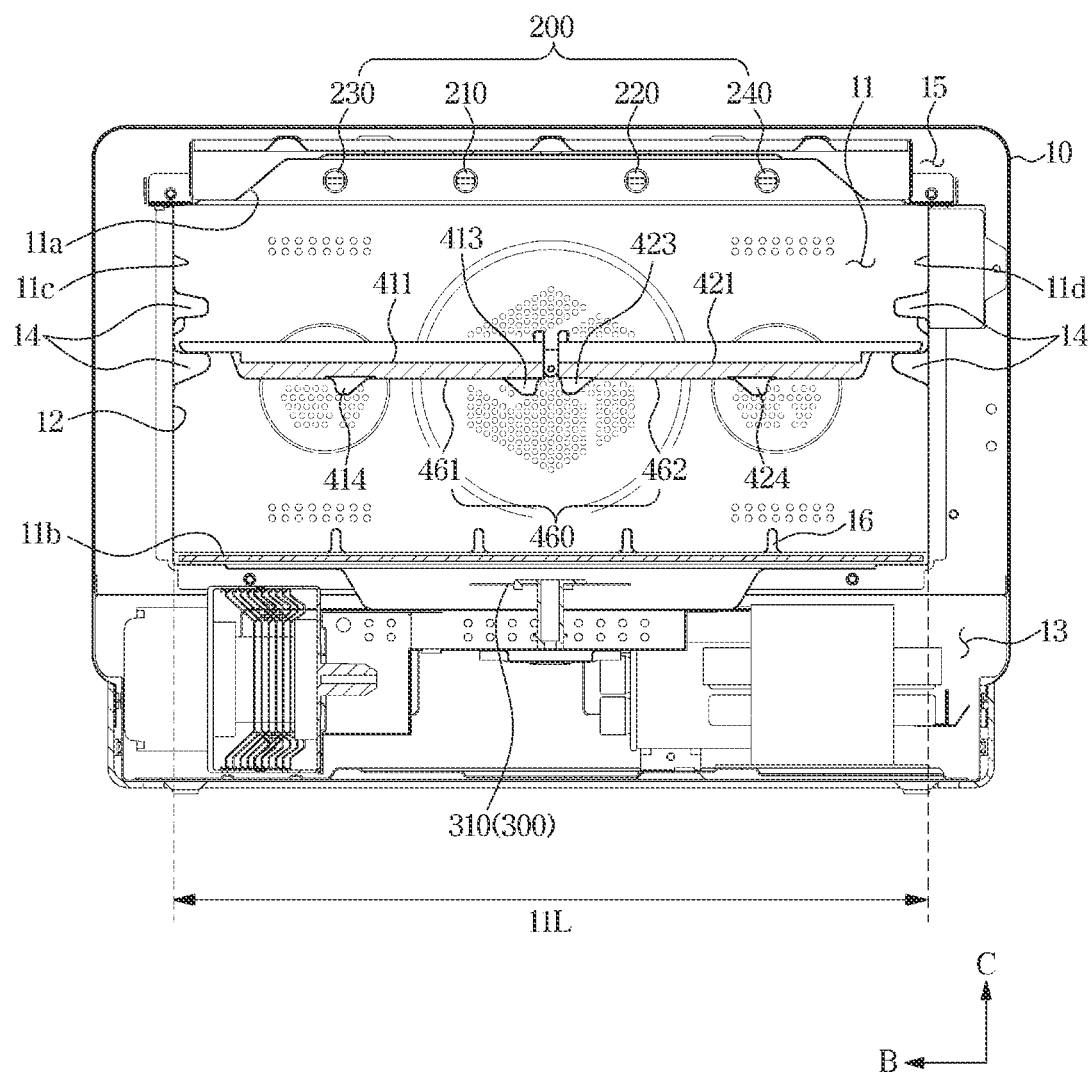
FIG. 4 is a front view illustrating the cooking apparatus shown in FIG. 1.
Figure 5:
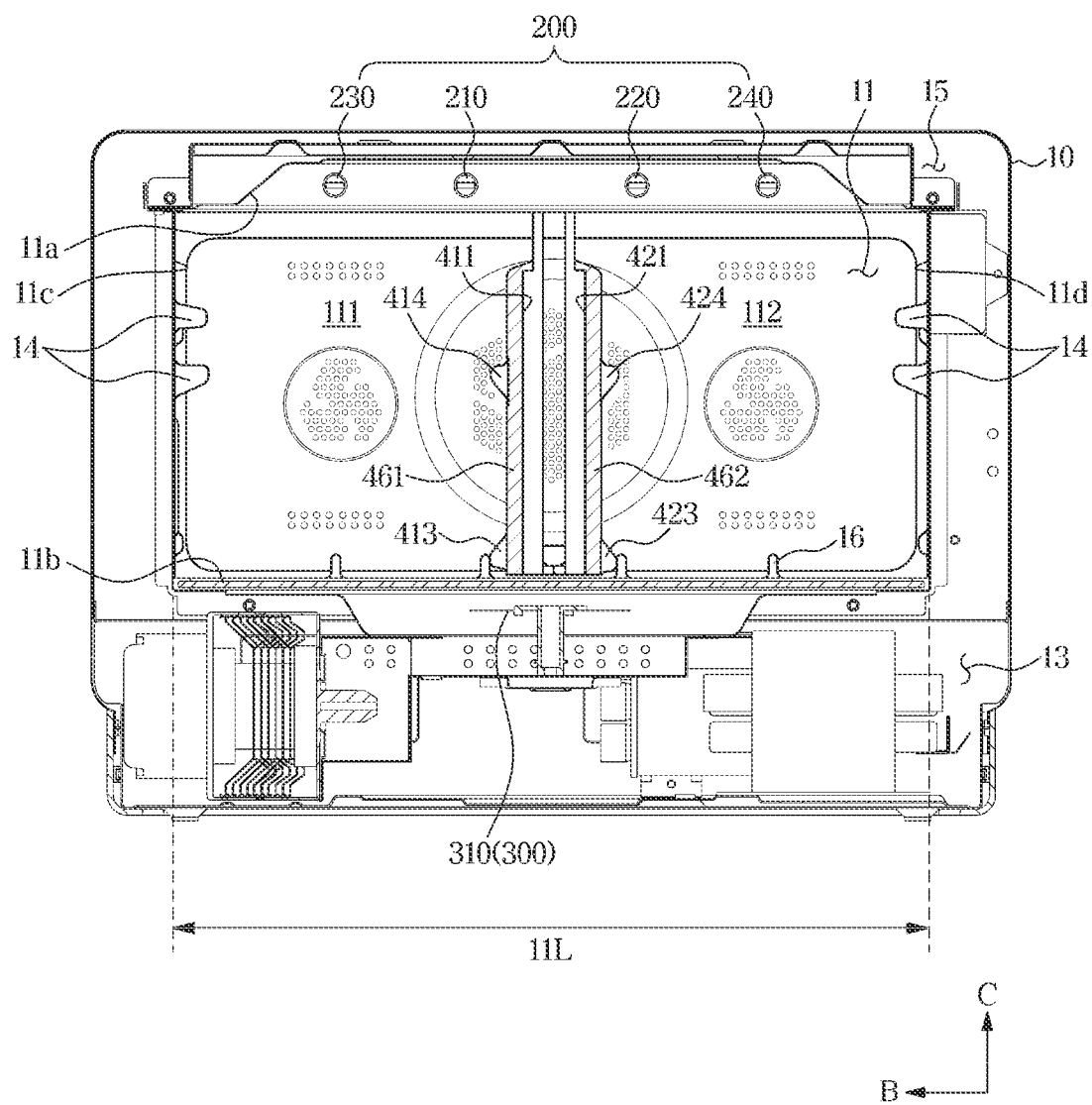
FIG. 5 is a view illustrating a state in which the folding shelf is folded in the cooking apparatus shown in FIG. 4.

FIG. 4 is a front view illustrating the cooking apparatus shown in FIG. 1. FIG. 5 is a view illustrating a state in which the folding shelf is folded in the cooking apparatus shown in FIG. 4.

Referring to FIGS. 4 and 5, it may be assumed that a position, in which the folding shelf 400 is installed in the cooking chamber 11, shown in FIG. 4 is referred to as the first mounting position, and a position, in which the folding shelf 400 is installed in the cooking chamber 11, shown in FIG. 5 is referred to as the second mounting position.

The folding shelf 400 may include shelf members 410 and 420 on which a food is placed, and a holder 450 supporting the shelf members 410 and 420. The shelf members 410 and 420 may be provided in plurality. That is, the shelf members 410 and 420 may include a first shelf member 410 and a second shelf member 420.

In order to correspond to the cooking chamber 11, the folding shelf 400 may be provided to include a long side 400L extending in the second direction B and a short side 400S extending in the first direction A.

The shelf members 410 and 420 may include the first shelf member 410 and the second shelf member 420. The first shelf member 410 may be arranged on a side along the second direction B, and the second shelf member 420 may be arranged on a side opposite to the first shelf member 410 along the second direction B.

That is, with respect to a center line G of the folding shelf 400 in the second direction B, the first shelf member 410 may be arranged on a side thereof, and the second shelf member 420 may be arranged on the opposite side thereof.

With respect to a direction in which the long side 400L of the folding shelf 400 extends, the first shelf member 410 may be arranged on a side in a direction of the long side 400L of the folding shelf, and the second shelf member 420 may be arranged on another side thereof.

The first shelf member 410 may include a first cooking surface 411 on which a food is placed. The second shelf member 420 may include a second cooking surface 421 on which a food is placed.

The first cooking surface 411 and the second cooking surface 421 may be provided to face the upper surface 11a of the cooking chamber 11 in response to mounting the folding shelf 400.

The cooking apparatus 1 may include the heat source 100 configured to provide heat to the inside of the cooking chamber 11 to allow a food to be cooked by the heat.

The heat source 100 may be provided to supply heat to a food placed on the folding shelf 400 to allow the food to be cooked. The food may be placed on the lower surface 11b of the cooking chamber 11 without the folding shelf 400. Even in this case, the heat source 100 may provide heat to the food placed on the lower surface 11b.

The heat source 100 may include a first heat source 200 arranged on the upper surface 11a of the cooking chamber 11, and a second heat source 300 arranged on the lower surface 11b of the cooking chamber 11.

The first heat source 200 may include a plurality of heaters 210, 220, 230, and 240 configured to generate radiant heat. The plurality of heaters 210, 220, 230, and 240 may directly transfer the radiant heat generated therein to a food.

The second heat source 300 may include a magnetron 310 configured to generate a high frequency. The magnetron 310 may be provided in such a way that the high frequency generated by the magnetron 310 is irradiated to an inside of a food to repeatedly convert a molecular arrangement of moisture contained in the food so as to generate frictional heat between molecules, thereby cooking the inside of the food.

The magnetron 310 may be arranged in the machine room 13. The magnetron 310 may oscillate a high frequency from the machine room 13 toward the lower surface 11b of the cooking chamber 11, and the high frequency may be irradiated to the folding shelf 400 by passing through the lower surface 11b.

The cooking apparatus 1 according to various embodiments of the present disclosure may include the first heat source 200 and the second heat source 300 to efficiently cook a food.

The first heat source 200 may efficiently transfer the radiant heat to the upper side of the food through the plurality of heaters 210, 220, 230, and 240 arranged on the upper surface 11a of the cooking chamber 11.

Further, the cooking apparatus 1 may include a heating member 460 arranged on the folding shelf 400 to allow the heat to be transferred to the lower side of the food during a cooking process.

The heating member 460 may be arranged on an opposite side of the respective cooking surfaces 411 and 421 in the shelf members 410 and 420 of the folding shelf 400. The heating member 460 may be arranged to face the lower surface 11b of the cooking chamber 11 in response to mounting the folding shelf 400 on the cooking chamber 11.

The heating member 460 may be provided in plurality. Particularly, the number of the heating members 460 may be provided to correspond to the number of the plurality of shelf members 410 and 420.

The heating member 460 may include a first heating member 461 coupled to the first shelf member 410 and a second heating member 462 coupled to the second shelf member 420.

The first heating member 461 may be arranged at a position corresponding to the first cooking surface 411 with respect to the third direction C. That is, the first heating member 461 may be arranged on a surface opposite to the first cooking surface 411 of the first shelf member 410.

The second heating member 462 may be arranged at a position corresponding to the second cooking surface 421 with respect to the third direction C. That is, the second heating member 462 may be arranged on the opposite surface of the second cooking surface 421 of the second shelf member 420.

The heating member 460 may generate heat by absorbing the high frequency generated by the magnetron 310. The high frequency radiated from the magnetron 310 facing the heating member 460 may be absorbed by the heating member 460, and the heating member 460 may generate heat by using the absorbed high frequency.

The heat generated by the heating member 460 may be transferred to the cooking surfaces 411 and 421 through the shelf members 410 and 420 of the folding shelf 400.

That is, as the heat generated by the heating member 460 is conducted to the cooking surfaces 411 and 421, the heat may be supplied to the lower side of the food placed on the cooking surfaces 411 and 421.

The heating member 460 may be formed of a ferrite material to absorb a high frequency. However, the disclosure is not limited thereto, and a material capable of generating heat by a high frequency may be mixed with ceramic, thereby forming the heating member 460.

Accordingly, because the heat is supplied to the upper side and the lower side of the food, a user can cook a food efficiently without turning over the food.

A case, in which a plurality of foods having different cooking temperatures is simultaneously put into the cooking chamber 11 and cooked in the cooking apparatus, may often occur. In this case, the cooking apparatus may individually set a temperature of heat, which is generated by the plurality of heaters, to be different.

That is, heat generated by one heater and heat generated by another heater among the plurality of heaters may be set to be different from each other, and thus different temperatures may be transferred to the plurality of foods.

When the plurality of heaters is arranged on the upper surface 11a of the cooking chamber 11 and supplies heat at different temperatures as in various embodiments of the present disclosure, a temperature corresponding to the heat supplied from each heater may be supplied at a position corresponding to each heater in the third direction C in the cooking chamber 11. Particularly, regions, in which different temperatures are provided, may be defined on each cooking surface 411 and 421 of the folding shelf 400.

The folding shelf 400 may include the first shelf member 410 and the second shelf member 420, and the first shelf member 410 and the second shelf member 420 may include cooking surfaces 411 and 421, respectively, as described above. Different temperatures may be provided to the cooking surfaces 411 and 421.

That is, the first shelf member 410 and the second shelf member 420 may be arranged side by side in the direction in which the long side 400L of the folding shelf 400 extends, and different temperatures may be provided to each of shelf members from the plurality of heaters 210, 220, 230, and 240.

Some of plurality of heaters 210, 220, 230, and 240 may be arranged at a position corresponding to the first cooking surface 411 of the first shelf member 410 with respect to the third direction C. The others of plurality of heaters 210, 220, 230, and 240 may be arranged at a position corresponding to the second cooking surface 421 of the second shelf member 420 with respect to the third direction C. Accordingly, the first cooking surface 411 and the second cooking surface 421 may be provided to directly receive different heat generated by the respective heaters.

Accordingly, even when a plurality of foods having different cooking temperatures is simultaneously put into the cooking chamber 11, the plurality of heaters 210, 220, 230, and 240 may provide heat at different temperatures to the food arranged on the first shelf member 410 and the second shelf member 420, respectively, based on arranging the plurality of foods on the first shelf member 410 and the second shelf member 420, respectively. That is, when each food is placed in different spaces, each food may be cooked at a different temperature.

The cooking chamber 11 may be formed in a rectangular parallelepiped shape including a long side 11L extending in the second direction B, and the corresponding folding shelf 400 may also be formed in rectangular shape including the long side 400L extending in the second direction B and the short side 400S extending in the first direction A.

When it is assumed that a region in which a food is placed and cooked on the folding shelf 400 is referred to as a cooking space, the first cooking surface 411 and the second cooking surface 421 may form the cooking space. The first cooking surface 411 and the second cooking surface 421 may be provided as separate components, and as a temperature of heat supplied to each cooking surface 411 and 421 is different, each cooking surface 411 and 421 may form cooking spaces having different temperatures. Further, the cooking space may be divided by the first cooking surface 411 and the second cooking surface 421.

According to one embodiment of the present disclosure, the first cooking surface 411 and the second cooking surface 421 may be arranged in the direction of the long side 400L of the folding shelf 400, and thus the cooking space of the folding shelf 400 may be divided with respect to the direction of the long side 400L of the folding shelf 400.

As for the cooking apparatus 1, the first cooking surface 411 and the second cooking surface 421 are arranged along the long side 400L of the folding shelf 400 to divide the cooking space along the long side 400L of the folding shelf 400.

In addition, each of the plurality of heaters 210, 220, 230, and 240 of the cooking apparatus 1 may be provided to include a long axis 200L extending in the first direction A, and each of the plurality of heaters 210, 220, 230, and 240 of the cooking apparatus 1 may be arranged to be spaced apart in the second direction B corresponding to the direction in which the long side 400L of the folding shelf 400 extends.

The plurality of heaters 210, 220, 230, and 240 may be configured to provide heat at different temperatures to the first cooking surface 411 and the second cooking surface 421 divided in the direction of the long side 400L of the folding shelf 400.

In addition, the heating member 460 may be configured to provide heat at different temperatures to the first cooking surface 411 and the second cooking surface 421 divided in the long side 400L direction of the folding shelf 400.

As described above, the first heating member 461 may be coupled to the first shelf member 410 and the second heating member 462 may be coupled to the second shelf member 420. The first shelf member 410 and the second shelf member 420 may be arranged side by side in the direction of the long side 400L of the folding shelf 400. Accordingly, the first heating member 461 and the second heating member 462 may also be arranged side by side in the direction of the long side 400L of the folding shelf 400.

The first heater 210 may be arranged on one side in the second direction B, and the second heater 220 may be arranged on the opposite side of the first heater 210 in the second direction B.

Particularly, the first heater 210 may be arranged on a side and the second heater 220 may be arranged on the opposite side with respect to the center line G of the folding shelf 400 based on the second direction B. The third heater 230 may be arranged on a side adjacent to the first heater 210, and the fourth heater 240 may be arranged on the opposite side adjacent to the second heater 220.

The first heater 210 and the third heater 230 may generate heat at the same temperature. Further, the second heater 220 and the fourth heater 240 may generate heat at the same temperature.

The first and third heaters 210 and 230 and the second and fourth heaters 220 and 240 may generate heat at different temperatures. That is, a temperature generated at a side of the center line G and a temperature generated at the opposite side of the center line G may be different from each other.

When it is assumed that heat generated by the first and third heaters 210 and 230 is set to be higher than heat generated by the second and fourth heaters 220 and 240, the cooking apparatus 1 may control the plurality of heaters 210, 220, 230, and 240 to allow the temperature of the heat generated by the first and third heaters 210 and 230 to be greater than the temperature of the heat generated by the second and fourth heaters 220 and 240.

Alternatively, the temperature of the heat generated by the plurality of heaters 210, 220, 230, and 240 may be set to be the same, and while the cooking apparatus 1 is driven, the cooking apparatus 1 may control the plurality of heaters 210, 220, 230, and 240 to allow the first and third heaters 210 and 230 to be continuously driven and to allow the second and fourth heaters 220 and 240 to be intermittently driven. Accordingly, the total temperature of the heat generated by the first and third heaters 210 and 230 may be greater than the total temperature of the heat generated by the second and fourth heaters 220 and 240.

As described above, with respect to the center line G, the first shelf member 410 may be arranged on a side thereof and the second shelf member 420 may be arranged on the opposite side thereof.

The first cooking surface 411 of the first shelf member 410 may be arranged at a position corresponding to the first and third heaters 210 and 230 with respect to the third direction C. The second cooking surface 421 of the second shelf member 420 may be arranged at a position corresponding to the second and fourth heaters 220 and 240 with respect to the third direction C.

As described above, because the heat generated by the first and third heaters 210 and 230 is different from the heat generated by the second and fourth heaters 240, the temperature of the heat transferred to the first cooking surface 411 may be different from the temperature of the heat transferred to the second cooking surface 421.

Heat generated by the first and third heaters 210 and 230 may be transferred from the upper surface 11a to the first cooking surface 411, and heat generated by the second and fourth heaters 240 may be transferred from the upper surface 11a to the second cooking surface 421.

The heat generated by the first and third heaters 210 and 230 may be different from the heat generated by the second and fourth heaters 220 and 240 and thus the temperature of the heat transferred to the first cooking surface 411 may be different from the temperature of the heat transferred to the second cooking surface 421. Accordingly, it is possible to place different foods having different cooking temperatures to each of the first cooking surface 411 of the first shelf member 410 and the second cooking surface 421 of the second shelf member 420, and it is possible to simultaneously cook the different foods in the cooking chamber 11.

Further, different foods may be positioned in the left and right direction based on the first direction A, which is the front of the cooking apparatus 1, and thus while the cooking apparatus 1 performs a cooking process, a user can easily observe the cooking process of different foods through the transparent member 24, in real time.

Heat conducted from the first and second heating members 461 and 462 may be transferred to the first and second shelf members 410 and 420, respectively. The heating member 460 may be heated by the high frequency oscillated from the magnetron 310 arranged on the lower surface 11b as described above, and the heat generated thereby may be conducted to the first and second cooking surfaces 411 and 421 through the first and second shelf members 410 and 420.

Heat at different temperatures may be supplied to the upper side of the first and second cooking surfaces 411 and 421 from the plurality of heaters 210, 220, 230, and 240, but the same heat may be supplied to the lower side of the first and second cooking surfaces 411 and 421 from the heating member 460.

However, the present disclosure is not limited thereto, and the heating member 460 may include the first heating member 461 and the second heating member 462 that radiate heat at different temperatures to the first and second cooking surfaces 411 and 421, respectively. That is, the first heating member 461 and the second heating member 462 may be provided to generate heat at different temperatures in response to absorbing the same amount of high frequency.

The first heating member 461 may be arranged at a position corresponding to the first cooking surface 411 with respect to the third direction C. The second heating member 462 may be arranged at a position corresponding to the second cooking surface 421 with respect to the third direction C.

The first heating member 461 may generate heat and provide heat at a predetermined temperature to the first cooking surface 411. The second heating member 462 may generate heat and provide heat at a temperature, which is different from the temperature generated by the first heating member 461, to the second cooking surface 421.

The cooking apparatus may include a plurality of shelf fixers 16 provided on a lower surface of the cooking chamber 11. The shelf fixer 16 may protrude inward from the lower surface of the cooking chamber 11. The shelf fixer 16 may allow the folding shelf 400 to be mounted at the second mounting position. That is, the folding shelf 400 at the second mounting position may be arranged between the plurality of shelf fixers 16 in the second direction B. The shelf fixer 16 may be in contact with lower stoppers 413 and 423 of the folding shelf 400, thereby fixing the folding shelf 400.

As an example, the shelf fixer 16 may be provided in the form of a protrusion. However, the present disclosure is not limited thereto and may include various shapes as long as the shelf fixer is provided to fix the folding shelf 400.

The shelf fixer 16 may extend long in the first direction A. However, the present disclosure is not limited thereto and a plurality of shelf fixers may be spaced apart from each other along the first direction A.

The folding shelf 400 may include stoppers 413, 415, 423, and 425. The stopper may include the lower stoppers 413 and 423. The lower stoppers 413 and 423 may be respectively provided in a lower portion of the first shelf member 410 and the second shelf member 420 to allow the folding shelf 400 to be supported with respect to the third direction C. That is, the lower stoppers 413 and 423 may be provided in plurality. The lower stopper 413 of the first shelf member 410 may be arranged adjacent to the second shelf member 420. The lower stopper 423 of the second shelf member 420 may be arranged adjacent to the first shelf member 410. That is, because the lower stopper 413 of the first shelf member 410 and the lower stopper 423 of the second shelf member 420 are arranged adjacent to each other, it is possible to prevent the folding shelf 400 from folding in a reverse direction.

As described above, when the folding shelf 400 is mounted to the cooking chamber 11 at the second mounting position, the lower stoppers 413 and 423 may be in contact with the shelf fixer 16. Accordingly, the folding shelf 400 may be fixed without falling out from the second mounting position or shaking.

The folding shelf 400 may include the support protrusions 414 and 424. The support protrusions 414 and 424 may be provided at a lower central portion of each shelf member. Together with the support member 14 provided on the side wall of the cooking chamber 11, the support protrusions 414 and 424 may support the folding shelf 400 and the auxiliary shelf 500. That is, the support protrusions 414 and 424 may be provided in plurality. The support protrusions 414 and 424 may include a first support protrusion 414 and a second support protrusion 424.

The first support protrusion 414 may be provided on a lower central portion of the first shelf member 410, and the second support protrusion 424 may be provided on a lower central portion of the second shelf member 420. However, the positions of the support protrusions 414 and 424 are not limited to the central portion of each shelf member. Alternatively, the positions of the support protrusions 414 and 424 may vary as long as the support protrusions 414 and 424 are provided to support the auxiliary shelf 500 to be described later. In addition, rather than providing one support protrusion to each shelf member, the support protrusions 414 and 424 may be formed in plurality so as to allow a plurality of auxiliary shelves 500 to be inserted thereto so as to form a plurality of auxiliary spaces. Accordingly, the support member 14 provided on the side wall of the cooking chamber 11 may also be formed in a number corresponding to the support protrusions 414 and 424 to allow the auxiliary shelf 500 to be inserted between the support protrusions 414 and 424 and the support member 14.

As shown in FIG. 4, the folding shelf 400 may be mounted at the first mounting position along the second direction B in the cooking chamber 11. That is, the folding shelf 400 may be arranged between the first support member 14a and the third support member 14c. Further, the folding shelf 400 may be arranged between the second support member 14b and the third support member 14c. Each support member 14 may support an end, adjacent to the first side wall 11c, of the first shelf member 410 to prevent the folding shelf 400 from folding along the third direction C. In addition, each support member 14 may support an end, adjacent to the second side wall 11d, of the second shelf member 420 to prevent the folding shelf 400 from folding along the third direction C. Accordingly, even when a food is placed on the cooking surfaces of the first shelf member 410 and the second shelf member 420, it is possible to prevent the folding shelf 400 from folding in the third direction C.

As shown in FIG. 5, the folding shelf 400 may be mounted at the second mounting position so as to extend along the third direction C in the cooking chamber 11. The folding shelf 400 may be arranged between the plurality of shelf fixers 16. That is, the lower stoppers 413 and 423 of the folding shelf 400 may be in contact with each of the plurality of shelf fixers 16 to fix the folding shelf 400.

The folding shelf 400 mounted at the second mounting position may divide the cooking chamber 11 into a plurality of cooking spaces. That is, the cooking chamber 11 may be divided into the first space 111 and the second space 112. As described above, because the plurality of heaters is individually controlled, a user can insert a food to a desired cooking space and cook the food by controlling each heater. The folding shelf 400 may serve as a shelf and a divider.

For example, in a state in which the first and third heaters 210 and 230 are driven and the second and fourth heaters 220 and 240 are not driven, the magnetron 310 may be operated. In this case, a food that requires both heat and a high frequency, such as a frozen bread, may be arranged in the first space 111, and a food that is cooked only with a high frequency, such as hot chocolate or soup, may be arranged in the second space 112.

As another example, in a state in which all of the plurality of heaters 210, 220, 230, and 240 are driven but driving temperatures thereof are set to be different, the magnetron 310 may not be driven. In this case, a food such as a frozen dumpling may be arranged in the first space 111, and a food that requires grilling such as a Neobiani (marinated grilled beef slice) or a steak may be arranged in the second space 112.

However, the above example is merely an example of cooking, and the type of food and the driving method of the heaters 210, 220, 230, and 240 and the magnetron are not limited to the above example. Accordingly, the cooking apparatus according to various embodiments of the present disclosure may secure a plurality of cooking spaces, and thus a user can simultaneously cook various foods requiring different cooking methods.

In the drawing, the folding shelf 400 is arranged at the center of the cooking chamber 11, but is not limited thereto. The folding shelf 400 may be arranged adjacent to the first side wall 11c. That is, the folding shelf 400 may be inserted between the shelf fixers 16 adjacent to the first side wall 11c. In this case, the first space may be formed to be narrower than the second space 112. Accordingly, a user can adjust the size of the cooking space according to the size of the food to be cooked. The above example is only an example, and thus it is also possible to use the cooking apparatus by forming the first space 111 to be wider than the second space 112.

Figure 6:
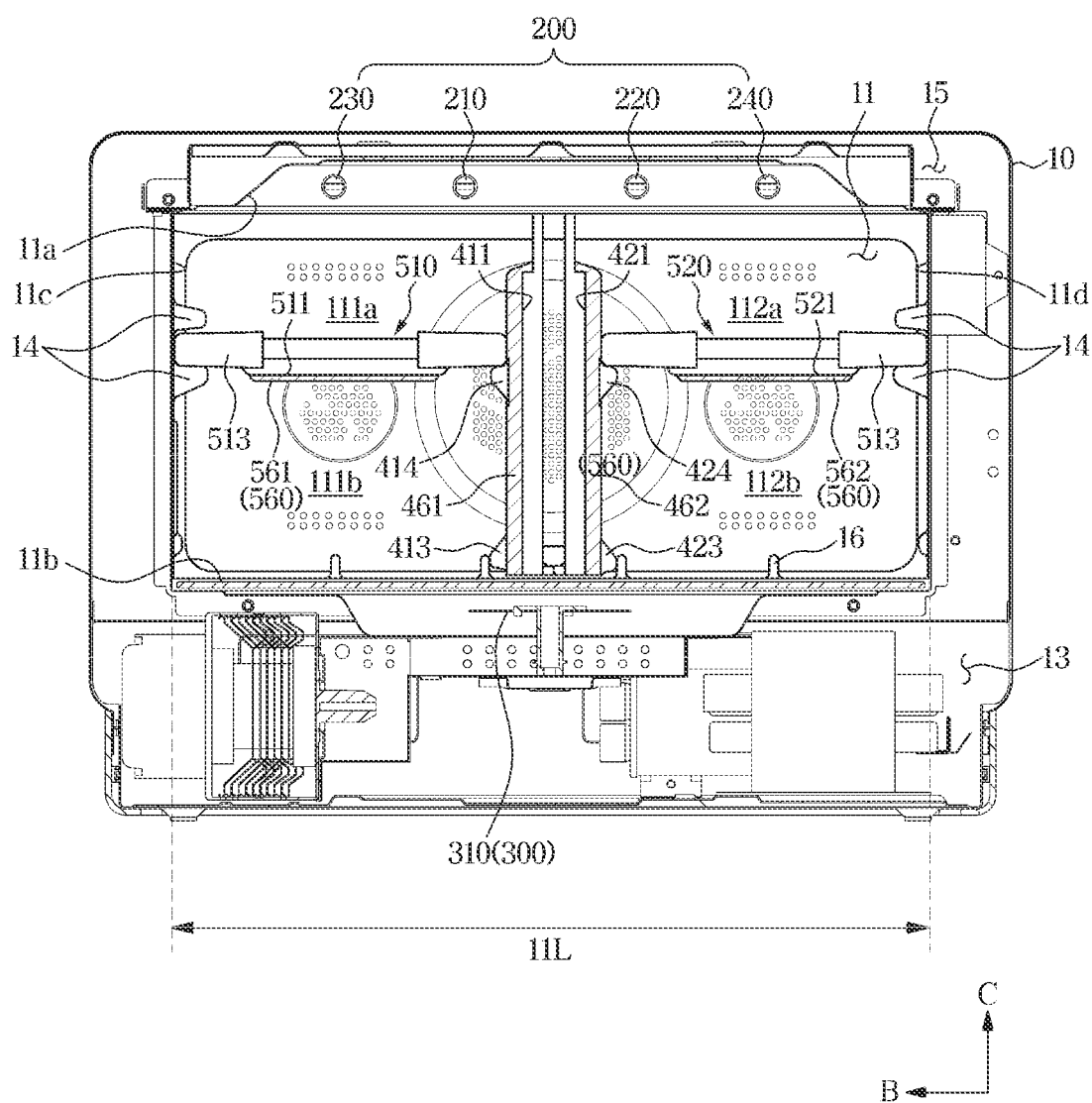
FIG. 6 is a view illustrating a state in which an auxiliary shelf is additionally inserted into the cooking apparatus shown in FIG. 5.
Figure 7:
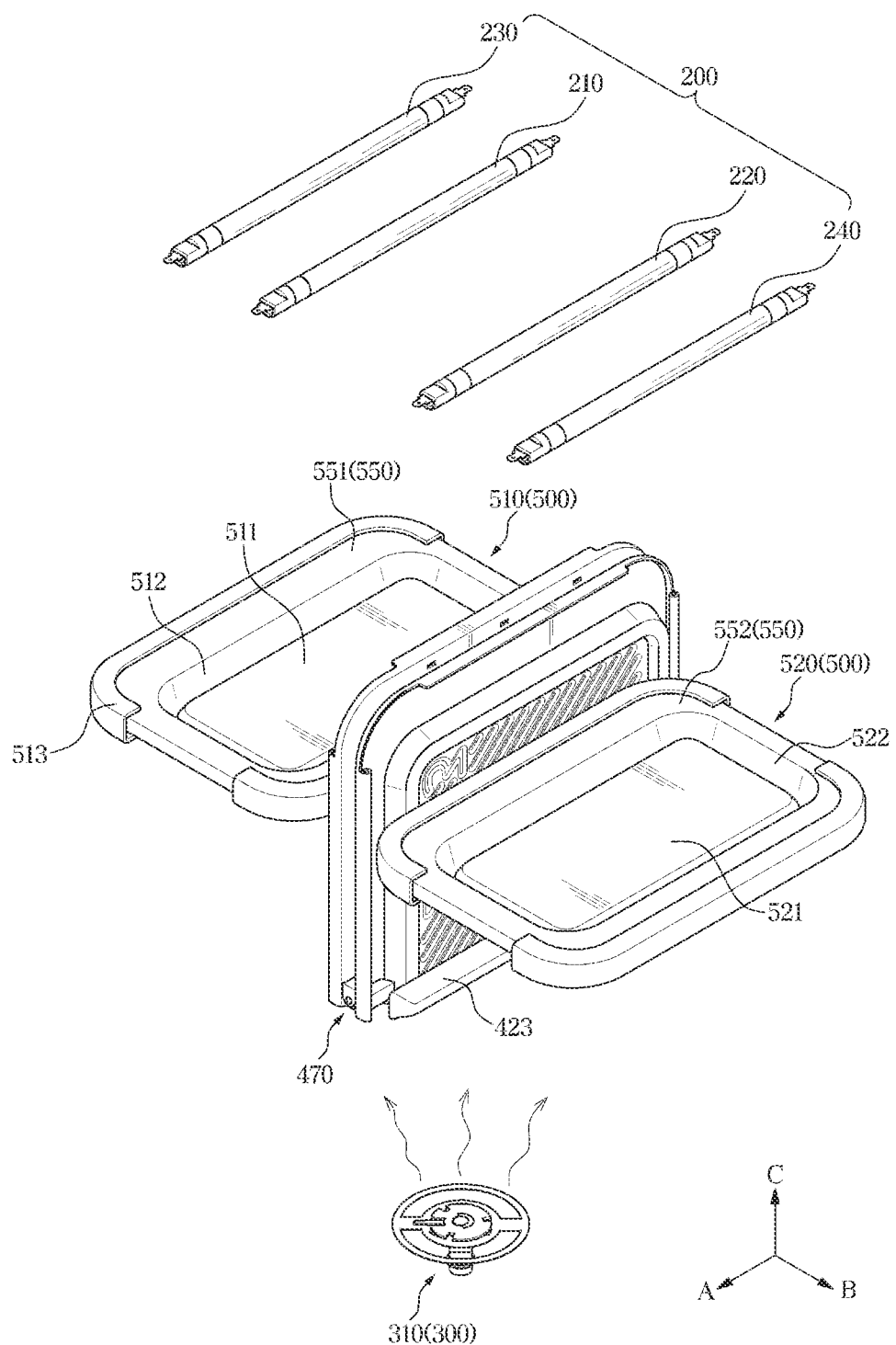
FIG. 7 is a view illustrating a partial configuration of the cooking apparatus shown in FIG. 1.

FIG. 6 is a view illustrating a state in which an auxiliary shelf is additionally inserted into the cooking apparatus shown in FIG. 5. FIG. 7 is a view illustrating a partial configuration of the cooking apparatus shown in FIG. 1.

Referring to FIGS. 6 and 7, the cooking apparatus may further include the plurality of auxiliary shelves 500 inserted into the cooking chamber 11. The plurality of auxiliary shelves 500 may include a first auxiliary shelf 510 and a second auxiliary shelf 520. The first auxiliary shelf 510 may be inserted into the first space 111 to form a plurality of auxiliary spaces. The second auxiliary shelf 520 may be inserted into the second space 112 to form a plurality of auxiliary spaces.

The auxiliary shelf 500 may include a holder 550. The holder 550 may shape a rim of the auxiliary shelf 500. The holder 550 may be provided to support the auxiliary shelf 500. The holder 550 may be provided in plurality. That is, the holder 550 may include a holder 551 of the first auxiliary shelf 510 and a holder 552 of the second auxiliary shelf 520.

The first auxiliary shelf 510 may include a first cooking surface 511 on which a food is placed. The second auxiliary shelf 520 may include a second cooking surface 521 on which a food is placed.

The first cooking surface 511 and the second cooking surface 521 may face the upper surface 11a of the cooking chamber 11 in response to mounting the auxiliary shelves 510 and 520. The heat source 100 may be configured to provide heat to a food placed on the auxiliary shelf 500 so as to cook the food.

Each auxiliary shelf 500 may include rims 512 and 522, respectively. The auxiliary shelf 500 may include a rim 512 of the first auxiliary shelf 510 and a rim 522 of the second auxiliary shelf 520. In addition, each of the auxiliary shelves 510 and 520 may include a coating member 513. The coating member 513 may be provided on the outside of the holder to prevent damage to the auxiliary shelf 500 by an external environment and by a collision upon mounting of the auxiliary shelf 500. Each of the auxiliary shelves 510 and 520 may include a heating member 560 attached to a lower portion thereof, respectively. That is, the heating member 560 may include a heating member 561 of the first auxiliary shelf 510 and a heating member 562 of the second auxiliary shelf 520.

The first auxiliary shelf 510 may be arranged between the first side wall 11c and the first shelf member 410. The first auxiliary shelf 510 may be inserted between the support members 14 provided on the first side wall 11c and supported by the support protrusion 414 of the first shelf member 410.

The second auxiliary shelf 520 may be arranged between the second side wall 11d and the second shelf member 420. The second auxiliary shelf 520 may be inserted between the support members 14 provided on the second side wall 11d and supported by the support protrusion 424 of the second shelf member 420.

The first auxiliary shelf 510 may be inserted into the first space 111 to form a plurality of auxiliary spaces. That is, the first auxiliary shelf 510 may divide the first space 111 into a first auxiliary space 11a and a second auxiliary space 111b. In addition, the second auxiliary shelf 520 may be inserted into the second space 112 to form a plurality of auxiliary spaces 112a, 112b. That is, the second auxiliary shelf 520 may divide the second space 112 into a third auxiliary space 112a and a fourth auxiliary space 112b.

Accordingly, the plurality of auxiliary spaces 111a, 111b, 112a, and 112b may include the first auxiliary space 111a, the second auxiliary space 111b, the third auxiliary space 112a, and the fourth auxiliary space 112b. However, the auxiliary space is not limited to four auxiliary spaces, and more auxiliary spaces 111a, 111b, 112a, and 112b may be formed according to the auxiliary shelves 510 and 520 to be inserted. Because the plurality of auxiliary spaces 111a, 111b, 112a, and 112b is formed, a user can cook a variety of foods with a single operation.

Figure 8:
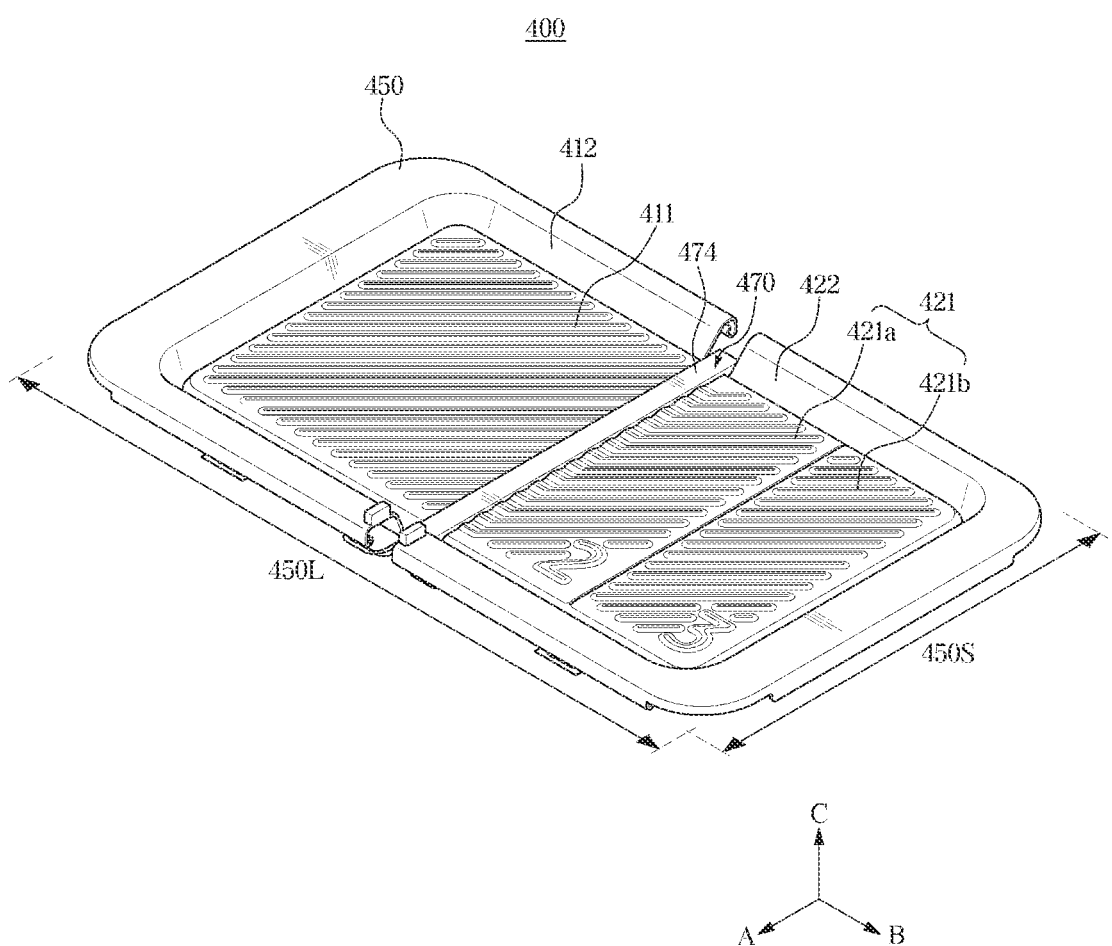
FIG. 8 is a view illustrating the folding shelf in the cooking apparatus shown in FIG. 1.
Figure 9:
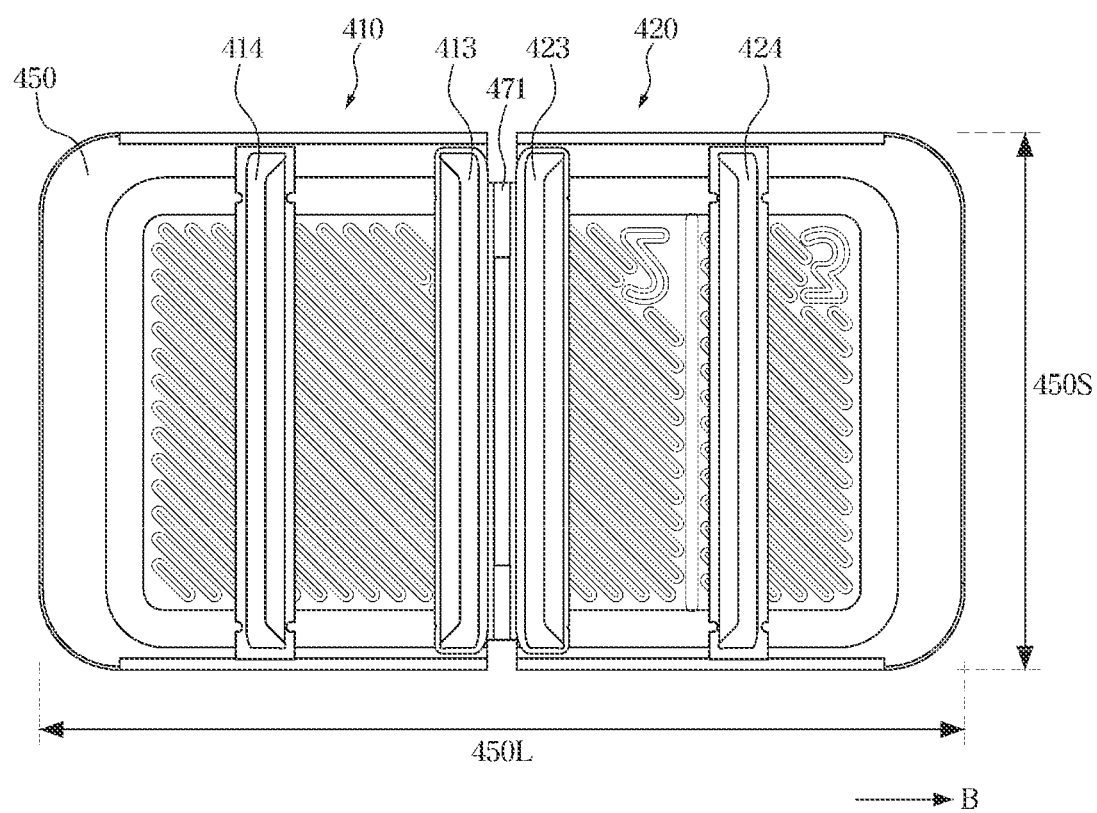
FIG. 9 is a rear view illustrating the folding shelf shown in FIG. 8.

FIG. 8 is a view illustrating the folding shelf in the cooking apparatus shown in FIG. 1. FIG. 9 is a rear view illustrating the folding shelf shown in FIG. 8.

Referring to FIGS. 8 and 9, the folding shelf 400 may include the first shelf member 410 and the second shelf member 420. The shelf member may include the cooking surfaces 411 and 421, rims 412 and 422, the stoppers 413, 415, 423, and 425, the support protrusions 414 and 424, and the holder 450. The folding shelf 400 may include a hinge device 470 configured to allow the first shelf member 410 and the second shelf member 420 to be folded.

The stopper may include upper stoppers 415 and 425. The upper stoppers 415 and 425 may be respectively provided in the upper portion of the first shelf member 410 and the second shelf member 420 to allow the folding shelf 400 to be supported in the third direction C. That is, the upper stoppers 415 and 425 may be provided in plurality. The upper stopper 415 of the first shelf member 410 may be arranged adjacent to the second shelf member 420. The upper stopper 425 of the second shelf member 420 may be arranged adjacent to the first shelf member 410. That is, because the upper stopper 415 of the first shelf member 410 and the upper stopper 425 of the second shelf member 420 are arranged adjacent to each other, it is possible to prevent the folding shelf 400 from folding without supporting the food.

The cooking surface may include the first cooking surface 411 provided on the first shelf member 410 and the second cooking surface 421 provided on the second shelf member 420. The first cooking surface 411 may be formed to be wider than the second cooking surface 421 so as to receive a food having a relatively larger area. The second cooking surface 421 may include a plurality of auxiliary cooking surfaces 421a and 421b. The auxiliary cooking surfaces 421a and 421b may include a first auxiliary cooking surface 421a and a second auxiliary cooking surface 421b. It is illustrated that the first auxiliary cooking surface 421a and the second auxiliary cooking surface 421b have the same size, but it is not limited thereto. Alternatively, the first auxiliary cooking surface 421a and the second auxiliary cooking surface 421b may have different sizes. Accordingly, a user can place a food on the cooking surface in consideration of the size of the food.

The folding shelf 400 may include the hinge device 470 arranged between the first shelf member 410 and the second shelf member 420. The hinge device 470 may include a hinge 471 and a connecting member 474.

The hinge 471 is configured to allow the first shelf member 410 and the second shelf member 420 to be rotatable. That is, the hinge 471 may allow the first shelf member 410 and the second shelf member 420 to be folded. The hinge 471 may be formed of a metal material or a plastic material that is not affected by electromagnetic waves. Accordingly, it is possible to minimize a risk caused by sparks generated inside due to the high frequency.

The connecting member 474 may be arranged between the first shelf member 410 and the second shelf member 420 to connect the first shelf member 410 and the second shelf member 420. The connecting member 474 may be formed to have the same height as the first shelf member 410 and the second shelf member 420 without protruding between the first shelf member 410 and the second shelf member 420. However, the present disclosure is not limited thereto and the connecting member 474 may protrude along the third direction C to define the first shelf member 410 and the second shelf member 420.

It is illustrated that the first shelf member 410 and the second shelf member 420 are spaced apart from each other by the connecting member 474 in the drawing, but the present disclosure is not limited thereto. Alternatively, the first shelf member 410 and the second shelf member 420 may be integrally formed with each other. In this case, the connecting member 474 may be removed.

The holder 450 may shape an edge of the folding shelf 400. The holder 450 may include a long side 450L corresponding to the long side 400L of the folding shelf 400 and a short side 450S corresponding to the short side 400S of the folding shelf 400. The holder 450 may be provided to support the arrangement in which the first shelf members 410 and the second shelf members 420 are arranged side by side in the direction of the long side 450L of the holder 450.

Figure 10:
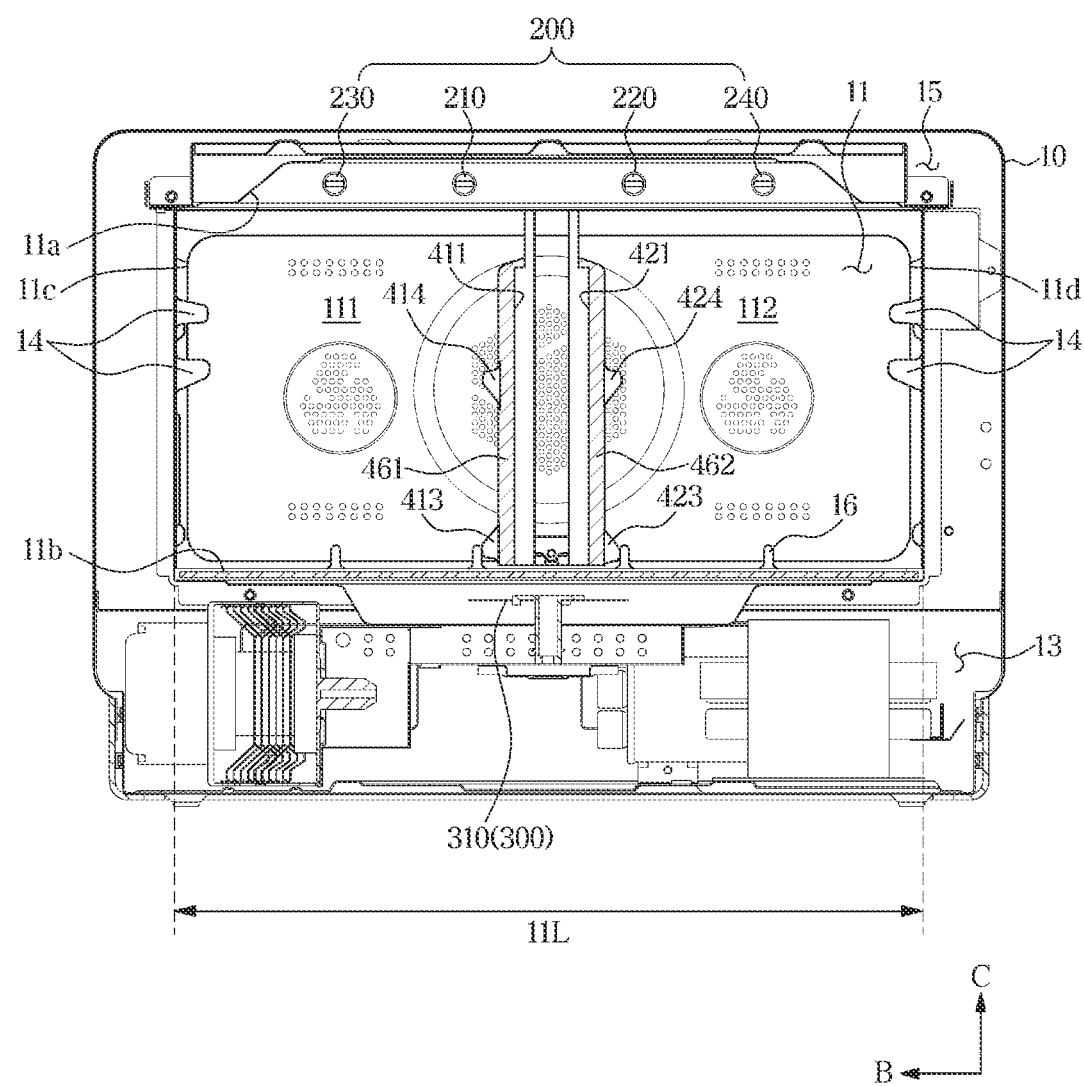
FIG. 10 is a front view illustrating a cooking apparatus according to various embodiments of the present disclosure.
Figure 11:
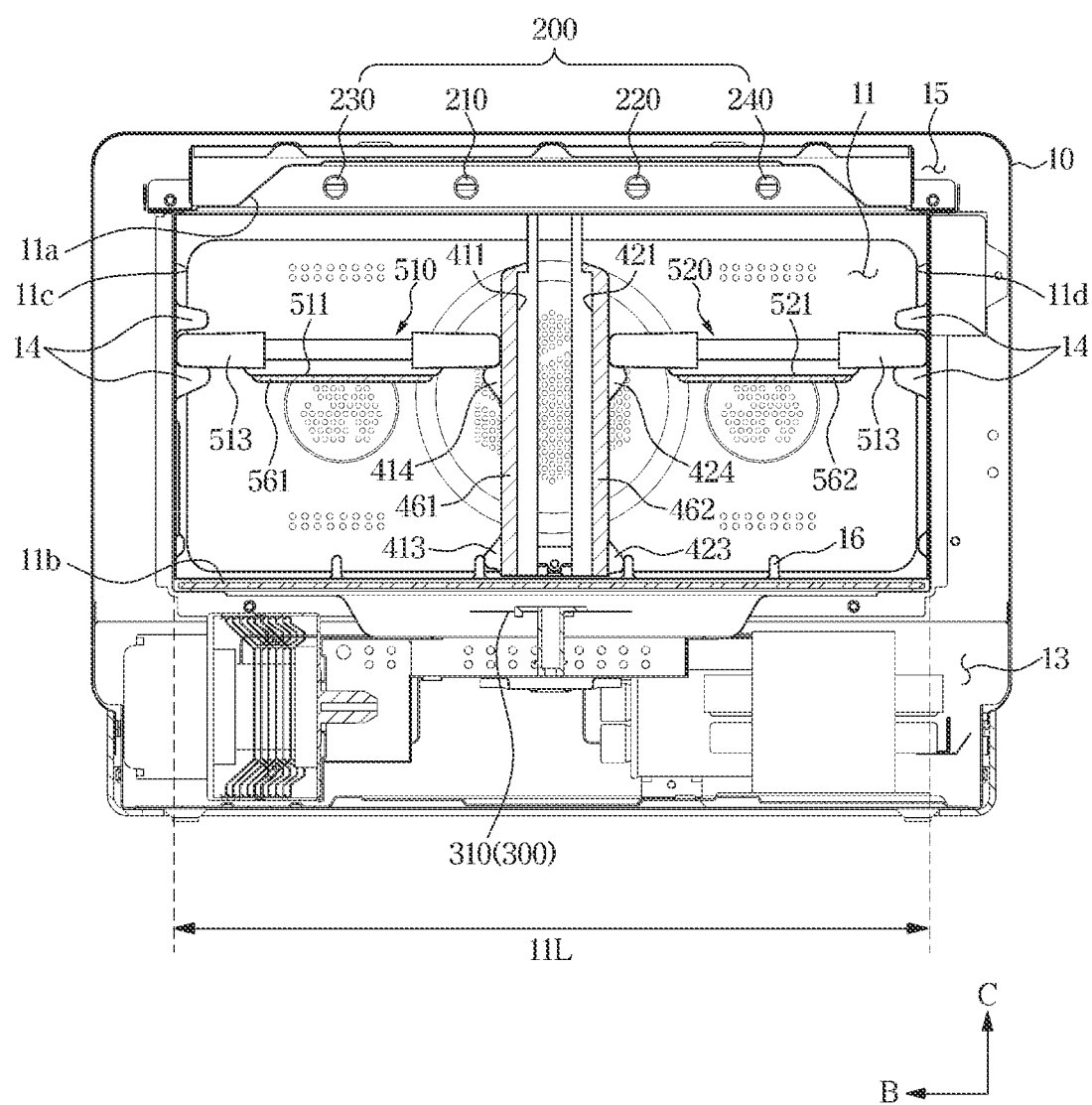
FIG. 11 is a view illustrating a state in which an auxiliary shelf is additionally inserted into the cooking apparatus shown in FIG. 10.
Figure 12:
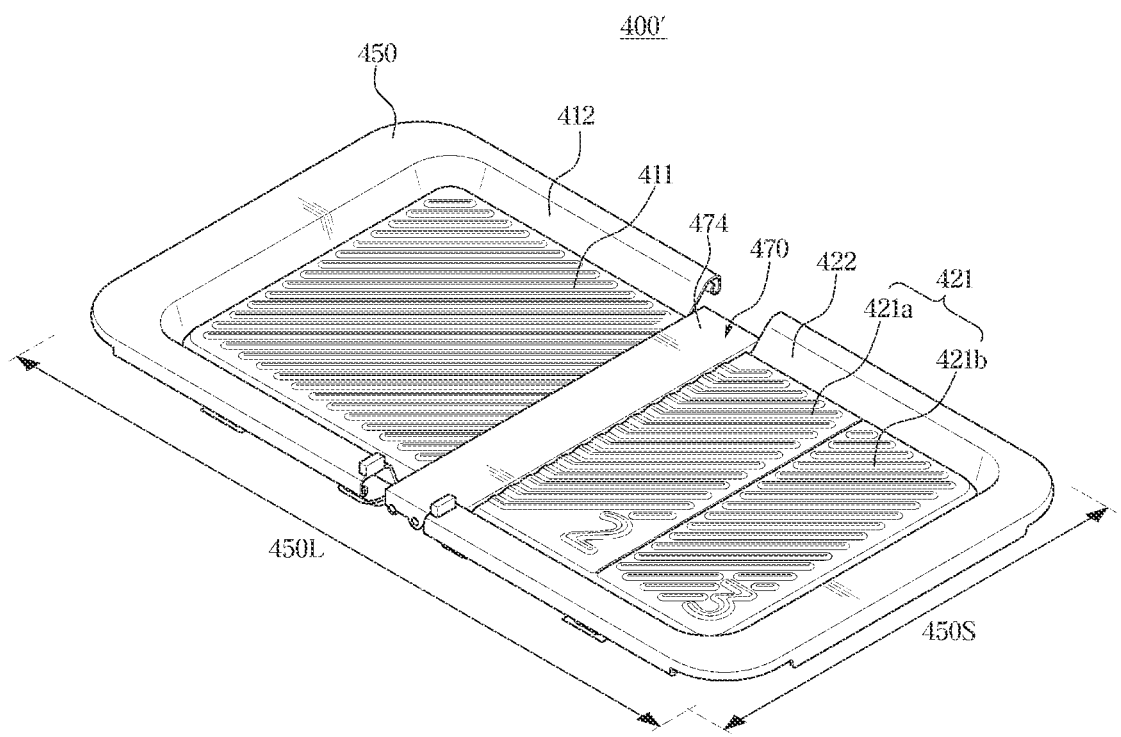
FIG. 12 is a view illustrating a folding shelf in the cooking apparatus shown in FIG. 10.
Figure 13:
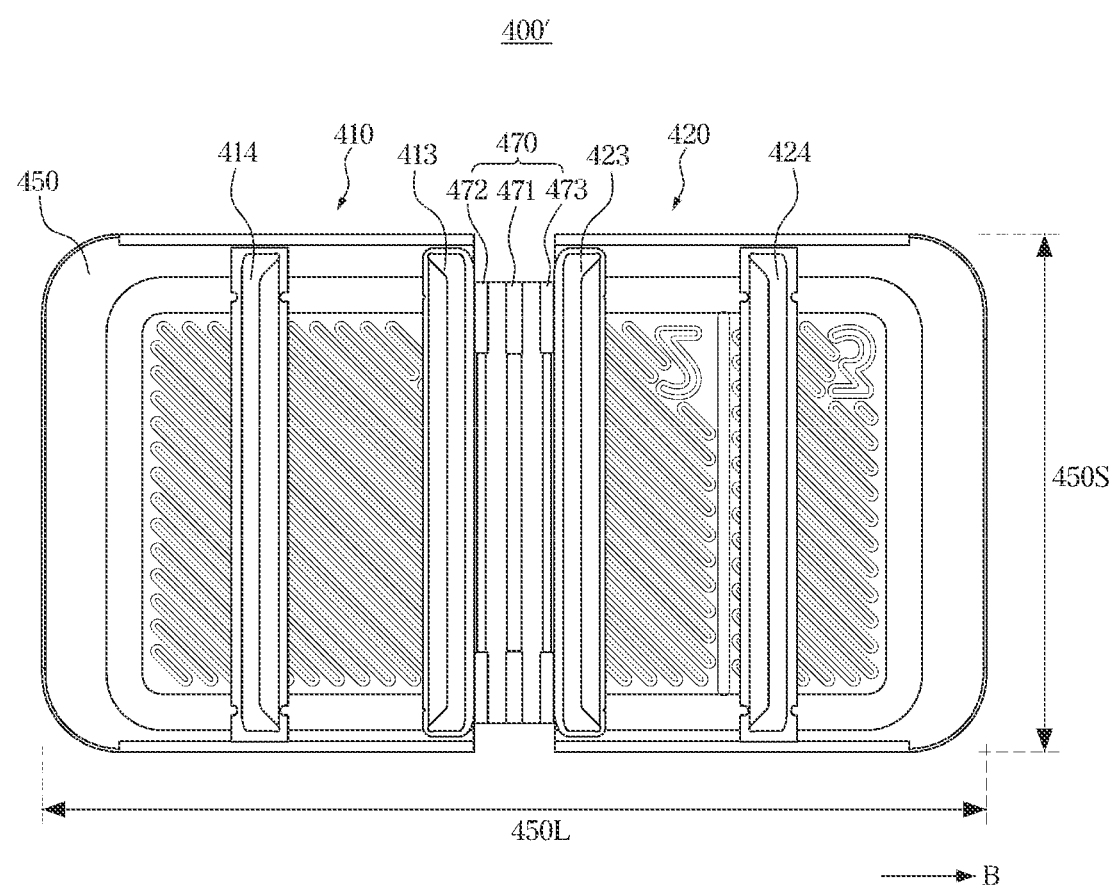
FIG. 13 is a rear view illustrating the folding shelf in the cooking apparatus shown in FIG. 10.

FIG. 10 is a front view illustrating a cooking apparatus according to another embodiment of the present disclosure. FIG. 11 is a view illustrating a state in which an auxiliary shelf is additionally inserted into the cooking apparatus shown in FIG. 10. FIG. 12 is a view illustrating a folding shelf in the cooking apparatus shown in FIG. 10. FIG. 13 is a rear view illustrating the folding shelf in the cooking apparatus shown in FIG. 10.

Referring to FIGS. 10 to 13, a folding shelf 400' according to various embodiments may be formed to correspond to the length of the cooking chamber 11 in the third direction C.

That is, based on the height of the cooking chamber 11 being low, the height of the fold shelf 400' may be changed.

The folding shelf 400' may include a hinge device 470. The hinge device 470 may include a plurality of hinges and a connecting member 474.

The plurality of hinges may include a left hinge 472, an intermediate hinge 471, and a right hinge 473. The left hinge 472 may allow the first shelf member 410 and the hinge device 470 to be rotatably coupled to each other. The left hinge 472 may be referred to as a first hinge 472. The right hinge 473 may allow the second shelf member 420 and the hinge device 470 to be rotatably coupled to each other. The right hinge 473 may be referred to as a second hinge 473.

In drawings, it is illustrated that the first shelf member 410 is coupled to the left hinge 472 and the second shelf member 420 is coupled to the right hinge 473, but is not limited thereto. The first shelf member 410 and the second shelf member 420 may be rotatably coupled to the intermediate hinge 471. In addition, the number of hinges is not limited to three, and may include two or less or four or more.

In comparison with the above-mentioned embodiment, the hinge may be provided in plurality and accordingly, the connecting member 474 may be formed to be longer. In addition, a length of the connecting member 474 in the second direction B may be changed according to a length of the cooking chamber 11 in the second direction B and the third direction C.

For example, when only the length of the cooking chamber 11 in the second direction B becomes longer than that of an embodiment of the present disclosure, the length of the connecting member 474 may be increased and thus the length of the folding shelf 400 in the second direction B at the first mounting position may be increased. Because only the length of the connecting member 474 is increased, the length of the folding shelf 400 in the third direction C (for example, height) may not be increased and thus the folding shelf 400 may be mounted at the second mounting position. In this case, the position of the second sensor 32 may be arranged at other position in accordance with the second mounting position or may be provided in plurality.

Therefore, the folding shelf 400' may be mounted in the cooking chamber 11 in various sizes, so as to divide the cooking space into a plurality of spaces. Accordingly, a user can be provided with various cooking environments to cook a plurality of foods. The plurality of cooking spaces may also vary according to the length of the connecting member 474, and accordingly, the length of the plurality of auxiliary shelves 500 may be inserted into each of the plurality of cooking spaces.

The folding shelf 400' may include upper stoppers 415 and 425. The upper stoppers 415 and 425 may be in contact with the connecting member 474 to prevent the folding shelf 400' from folding without supporting the food.

Figure 14:
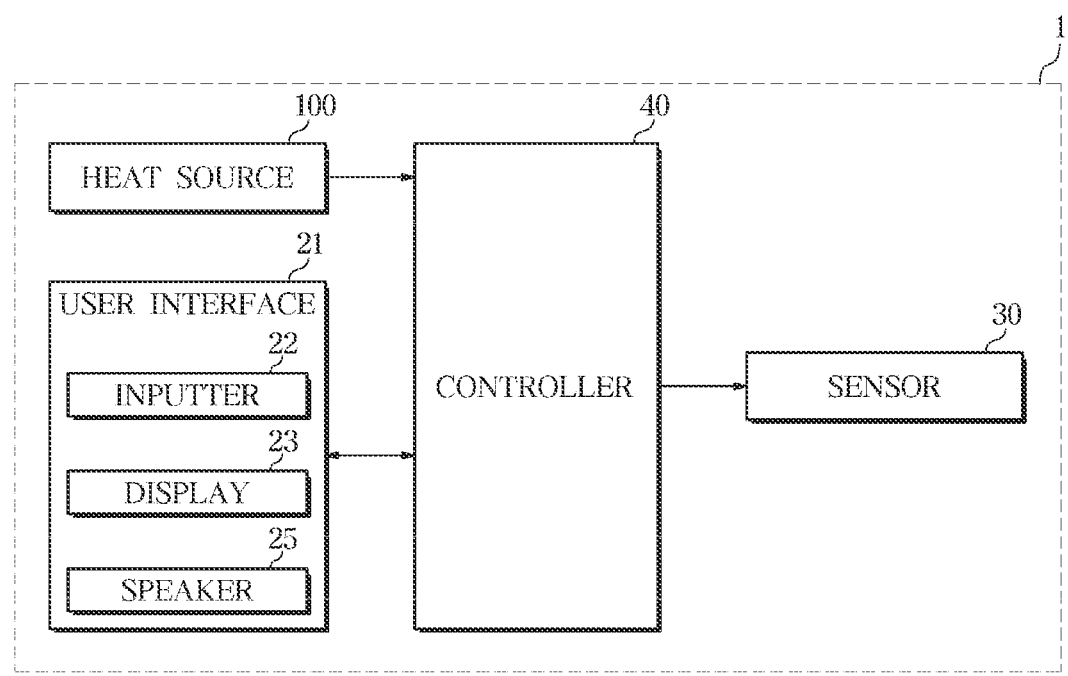
FIG. 14 is a block diagram illustrating a control flow of the cooking apparatus according to various embodiments of the present disclosure.

FIG. 14 is a block diagram illustrating a control flow of the cooking apparatus according to various embodiments of the present disclosure.

Referring to FIG. 14, the cooking apparatus according to various embodiments includes the at least one sensor 30 configured to detect the mounting positions of the folding shelf 400 and the auxiliary shelf 500, the user interface 21 configured to receive an input from a user and display operation information, the controller 40 configured to perform a control operation to guide a recommended cooking space and a recommended recipe corresponding to a target food in response to obtaining information on the target food, and the heat source 100 configured to transfer heat and a high frequency to the cooking chamber 11.

However, each configuration of the cooking apparatus shown in FIG. 7 may be removed according to embodiments, and a configuration not shown may be added thereto, as necessary.

The user interface 21 according to various embodiments may include the input 22 configured to receive an input from a user, the display 23 provided to display operation information, and the speaker configured to output a sound.

The input 22 according to various embodiments may receive a selection of a cooking temperature, a selection of a cooking time, a selection of a cooking space, a start of a cooking operation and a stop of a cooking operation and a selection of a control target, as illustrated in FIG. 1.

As illustrated in FIG. 1, the display 23 according to various embodiments may display information that is input by a user, such as information on a cooking temperature, a cooking time, and a cooking space selected by a user. In addition, the display 23 may display a notification about an arrangement of target food, information on a recommended food that may be cooked simultaneously with the target food, or information on a recommended menu that may be made from the target food.

The speaker according to various embodiments may output various sound notifications based on the control of the controller 40. For this, the speaker may be provided as a known type of speaker device.

The controller 40 according to various embodiments may control the heat source 100 to cook the target food based on a user input that is input through the input 22. In addition, in response to obtaining the information on the target food, the controller 40 may control the heat source 100 to transfer the heat and high frequency to a recommended cooking space among the plurality of cooking spaces.

While a target food is arranged in the recommended cooking space, the controller 40 may control at least one of the plurality of heat sources 100 to heat the recommended cooking space based on a recipe corresponding to the target food.

In this case, the recipe may include information on a cooking temperature and a cooking time corresponding to the target food. In other words, the recipe may include at least one of a cooking temperature, a cooking time, or an output of the heat source 100 as a cooking parameter for the operation of the heat source 100. A recipe to be applied to each cooking space may be determined based on a user input.

In addition, while the target food is arranged in a cooking space other than the recommended cooking space, the controller 40 may control at least one of the plurality of heat sources 100 to heat the cooking space in which the target food is placed, based on a recipe corresponding to the target food.

Further, in response to obtaining information on a target food from a user, the controller 40 may determine a recommended food that may be cooked in a cooking space other than the recommended cooking space, and control the user interface 21 to display the recommended food.

Further, in response to obtaining information on a target food from a user, the controller 40 may determine a recommended menu that uses the target food as a material and control the user interface 21 to display the recommended menu.

The controller 40 may include at least one memory configured to store a program for performing the above-described operation and an operation to be described later, and at least one processor configured to execute the stored program.

The heat source 100 according to various embodiments may be provided in plurality, and configured to provide heat to the cooking chamber 11.

While the present disclosure has been particularly described with reference to exemplary embodiments, it should be understood by those of skilled in the art that various changes in form and details may be made without departing from the spirit and scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A cooking apparatus, comprising:
a cooking chamber in which a food is cooked and opened in a first direction;
a heater arranged at a side of the cooking chamber and configured to provide heat into the cooking chamber;
a magnetron configured to generate a high frequency supplied into the cooking chamber; and
a folding shelf detachably mounted in the cooking chamber and configured to be foldable,
wherein the folding shelf extends in a second direction to support the food at a first mounting position, and
wherein, while the folding shelf is in a folded state, the folding shelf is configured to divide the cooking chamber into a plurality of cooking spaces at a second mounting position.

2. The cooking apparatus of claim 1, wherein the plurality of cooking spaces comprises a first space arranged on a first side along the second direction; and a second space arranged on a second side along the second direction.

3. The cooking apparatus of claim 2, further comprising:
a shelf fixer protruding from a lower portion of the cooking chamber to an inside of the cooking chamber so as to fix the folding shelf.

4. The cooking apparatus of claim 3, wherein:
the shelf fixer comprises a plurality of shelf fixers,
the plurality of shelf fixers is spaced apart along the second direction, and
the folding shelf is arranged between the plurality of shelf fixers.

5. The cooking apparatus of claim 2, wherein:
the heater comprises a plurality of heaters, and
the plurality of heaters is arranged in an upper portion of the cooking chamber to be spaced apart along the second direction, and at least one of the plurality of heaters is configured to provide heat to the first space.

6. The cooking apparatus of claim 2, further comprising:
a first side wall and a second side wall facing each other in the second direction of the cooking chamber; and
at least one sensor provided in the cooking chamber and configured to detect a mounting position of the folding shelf,
wherein the at least one sensor comprises a first sensor provided on at least one of the first side wall or the second side wall and configured to detect whether the folding shelf is mounted at the first mounting position.

7. The cooking apparatus of claim 6, wherein:
the folding shelf extends in a third direction at the second mounting position, and
the cooking apparatus further comprises a second sensor provided on a rear wall of the cooking chamber and is configured to detect whether the folding shelf is mounted at the second mounting position.

8. The cooking apparatus of claim 7, further comprising:
a first auxiliary shelf inserted into the first space to divide the first space into a plurality of first auxiliary spaces, and a second auxiliary shelf inserted into the second space to divide the second space into a plurality of second auxiliary spaces.

9. The cooking apparatus of claim 8, further comprising:
a user interface configured to:
display an insertion position of the folding shelf based on information that is detected by the at least one sensor, and
receive an input from a user; and
a controller configured to control the user interface to display a recommended cooking space among the plurality of cooking spaces in response to obtaining the information detected by the at least one sensor.

10. The cooking apparatus of claim 9, wherein the controller is configured to control the heater and the magnetron to transfer heat and a high frequency to the recommended cooking space among the plurality of cooking spaces.

11. The cooking apparatus of claim 2, wherein:
the cooking chamber comprises a first side wall and a second side wall provided to face each other and comprising a support member, respectively,
the folding shelf comprises a first shelf member forming the first space between the first side wall and the first shelf member; and a second shelf member forming the second space between the second side wall and the second shelf member, and
each of the first shelf member and the second shelf member comprises a support protrusion formed on a lower surface thereof to support a plurality of auxiliary shelves.

12. The cooking apparatus of claim 11, wherein the plurality of auxiliary shelves, while the folding shelf is in a folded state, comprises:
a first auxiliary shelf inserted between the first side wall and the first shelf member and supported by the support member of the first side wall and the support protrusion of the first shelf member; and
a second auxiliary shelf inserted between the second side wall and the second shelf member and supported by the support member of the second side wall and the support protrusion of the second shelf member.

13. The cooking apparatus of claim 11, wherein:
the folding shelf further comprises a hinge device arranged between the first shelf member and the second shelf member, and
the hinge device comprises:
a connecting member extending in the second direction between the first shelf member and the second shelf member,
a first hinge configured to rotate the first shelf member and the connecting member, and
a second hinge configured to rotate the second shelf member and the connecting member.

14. The cooking apparatus of claim 11, wherein the folding shelf comprises a stopper provided on at least one of an upper portion or a lower portion of the first shelf member and the second shelf member to allow the folding shelf to be supported in a vertical direction.

15. The cooking apparatus of claim 14, wherein:
the stopper comprises a plurality of lower stoppers provided in a lower portion of each of the first shelf member and the second shelf member, and
the cooking apparatus further comprises a plurality of shelf fixers protruding from the lower portion of the cooking chamber toward an inside of the cooking chamber so as to be in contact with the plurality of lower stoppers at the second mounting position so as to fix the folding shelf.

16. A cooking apparatus, comprising:

a cooking chamber opened in a first direction;

a plurality of heaters arranged in a second direction so as to provide heat into the cooking chamber, the plurality of heaters configured to be controlled independently of each other;

a magnetron provided to generate a high frequency supplied into the cooking chamber; and a folding shelf detachably mounted in the cooking chamber so as to support a food and configured to be foldable, wherein the folding shelf is configured to divide the cooking chamber into a plurality of cooking spaces arranged in the second direction when mounted to the cooking chamber in a folded state.

17. The cooking apparatus of claim 16, wherein the folding shelf is mounted in a vertical direction while in the folded state and is configured to divide the plurality of cooking spaces in a left and right direction.

18. The cooking apparatus of claim 16, further comprising:

a plurality of auxiliary shelves inserted into each of the plurality of cooking spaces and configured to divide the each of the plurality of cooking spaces into a plurality of auxiliary cooking spaces arranged in a third direction.

19. A cooking apparatus, comprising:

a cooking chamber including a first side wall and a second side wall facing each other;

a heater configured to provide heat into the cooking chamber;

a magnetron configured to generate a high frequency supplied into the cooking chamber; and a folding shelf detachably mounted in the cooking chamber and configured to fold, wherein the folding shelf extends between the first side wall and the second side wall to support a food at a first mounting position and, when the folding shelf is in a folded state, the folding shelf is configured to divide the cooking chamber into a plurality of cooking spaces at a second mounting position.

20. The cooking apparatus of claim 19, wherein the folding shelf extends in a vertical direction at the second mounting position to arrange the plurality of cooking spaces in a left and right direction.

* * * * *